(12) United States Patent
Arrieta et al.

(10) Patent No.: US 12,458,784 B2
(45) Date of Patent: Nov. 4, 2025

(54) BALLOON DILATION DEVICE

(71) Applicant: Dalent, LLC, Coral Gables, FL (US)

(72) Inventors: Agustin Arrieta, Miami, FL (US); Peter Flores, Miami, FL (US); Shawn McCoy, Little Rock, AR (US); Michael Dollar, Hot Springs Village, AR (US)

(73) Assignee: Dalent, LLC, Miami, FL (US)

( * ) Notice: Subject to any disclaimer, the term of this patent is extended or adjusted under 35 U.S.C. 154(b) by 996 days.

(21) Appl. No.: 17/615,758

(22) PCT Filed: Jun. 2, 2020

(86) PCT No.: PCT/US2020/035738
§ 371 (c)(1),
(2) Date: Dec. 1, 2021

(87) PCT Pub. No.: WO2020/251805
PCT Pub. Date: Dec. 17, 2020

(65) Prior Publication Data
US 2022/0305242 A1 Sep. 29, 2022

Related U.S. Application Data

(60) Provisional application No. 62/859,937, filed on Jun. 11, 2019.

(51) Int. Cl.
*A61M 29/02* (2006.01)
*A61M 25/10* (2013.01)

(52) U.S. Cl.
CPC ..... *A61M 29/02* (2013.01); *A61M 2025/1004* (2013.01); *A61M 2025/1013* (2013.01);
(Continued)

(58) Field of Classification Search
CPC .......... A61M 29/02; A61M 2025/1013; A61M 2025/1065; A61M 2025/0175
See application file for complete search history.

(56) References Cited

U.S. PATENT DOCUMENTS 705,346 A 7/1902 Hamilton
1,735,519 A 11/1929 Vance
(Continued)

FOREIGN PATENT DOCUMENTS

EP 0 371 486 6/1990
WO WO 2000/062852 10/2000
(Continued)

OTHER PUBLICATIONS

Gottmann, et al., Balloon Dilatation of Recurrent Ostial Occlusion of the Frontal Sinus, CIRSE Abstract and Presentation (Mar. 2001) B-04353.
(Continued)

*Primary Examiner* — Anh T Dang
(74) *Attorney, Agent, or Firm* — Knobbe, Martens, Olson & Bear, LLP

(57) ABSTRACT

A dilator device including an elongated flexible material sleeve having a hollow interior extending along a distal portion and a proximal portion thereof. An expandable or inflatable bladder is connected to the distal portion and disposable radially outward from an exterior of the sleeve when in an expanded and/or inflated orientation. The elongated sleeve comprising a tip having a predetermined configuration that facilitates positioning the elongated sleeve within an intended body part. A fluid input is structured for removable connection to a fluid source and is disposed on the sleeve, in fluid communication with the bladder. An access opening is formed on the proximal portion and is cooperatively dimensioned with the hollow interior to removably receive any one of a plurality of different types of positioning instruments within the sleeve.

17 Claims, 24 Drawing Sheets

(52) U.S. Cl.
CPC ............ *A61M 2025/1061* (2013.01); *A61M 2025/1065* (2013.01); *A61M 2210/0618* (2013.01)

(56) References Cited

U.S. PATENT DOCUMENTS

| | | | |
|---|---|---|---|
| 2,819,718 A | 1/1958 | Goldman | |
| 3,799,170 A | 3/1974 | Walsh et al. | |
| 3,903,893 A | 9/1975 | Scheer | |
| 4,311,146 A | 1/1982 | Wonder | |
| 4,312,353 A | 1/1982 | Shahbabian | |
| 4,341,218 A | 7/1982 | U | |
| 4,819,637 A | 4/1989 | Dormandy, Jr. et al. | |
| 5,021,043 A | 6/1991 | Becker et al. | |
| 5,035,686 A | 7/1991 | Crittenden et al. | |
| 5,098,379 A | 3/1992 | Conway et al. | |
| 5,169,386 A | 12/1992 | Becker et al. | |
| 5,171,297 A | 12/1992 | Barlow et al. | |
| 5,176,638 A | 1/1993 | Don Michael | |
| 5,304,123 A | 4/1994 | Atala et al. | |
| 5,370,899 A | 12/1994 | Conway et al. | |
| 5,395,331 A | 3/1995 | O'Neill et al. | |
| 5,454,789 A | 10/1995 | Burns et al. | |
| 5,569,219 A | 10/1996 | Hakki et al. | |
| 5,681,344 A | 10/1997 | Kelly | |
| 5,788,681 A | 8/1998 | Weaver et al. | |
| 6,325,777 B1 | 12/2001 | Zadno-Azizi et al. | |
| 6,447,540 B1 | 9/2002 | Fontaine et al. | |
| 7,108,706 B2 | 9/2006 | Hogle | |
| 7,169,163 B2 | 1/2007 | Becker | |
| 7,462,175 B2 | 12/2008 | Chang et al. | |
| 7,500,971 B2 | 3/2009 | Chang et al. | |
| 7,559,925 B2 | 7/2009 | Goldfarb et al. | |
| 7,578,099 B2 | 8/2009 | Schlegel | |
| 7,591,832 B2 | 9/2009 | Eversull et al. | |
| 7,604,627 B2 | 10/2009 | Kojouri | |
| 7,645,272 B2 | 1/2010 | Chang et al. | |
| 7,654,997 B2 | 2/2010 | Makower et al. | |
| 7,670,284 B2 | 3/2010 | Padget et al. | |
| 7,678,099 B2 | 3/2010 | Ressemann et al. | |
| 7,695,490 B2 | 4/2010 | Hogle | |
| 7,717,933 B2 | 5/2010 | Becker | |
| 7,720,521 B2 | 5/2010 | Chang et al. | |
| 7,727,186 B2 | 6/2010 | Makower et al. | |
| 7,727,226 B2 | 6/2010 | Chang et al. | |
| 7,740,642 B2 | 6/2010 | Becker | |
| 7,744,620 B2 | 6/2010 | Pedersen et al. | |
| 7,753,929 B2 | 7/2010 | Becker | |
| 7,753,930 B2 | 7/2010 | Becker | |
| 7,771,409 B2 | 8/2010 | Chang et al. | |
| 7,785,315 B1 | 8/2010 | Muni et al. | |
| 7,799,048 B2 | 9/2010 | Hudson et al. | |
| 7,803,150 B2 | 9/2010 | Chang et al. | |
| 7,854,744 B2 | 12/2010 | Becker | |
| 7,879,061 B2 | 2/2011 | Keith et al. | |
| 7,918,871 B2 | 4/2011 | Truitt et al. | |
| D643,115 S | 8/2011 | Gonzales et al. | |
| 8,080,000 B2 | 12/2011 | Makower et al. | |
| 8,088,101 B2 | 1/2012 | Chang et al. | |
| 8,090,433 B2 | 1/2012 | Makower et al. | |
| 8,100,933 B2 | 1/2012 | Becker | |
| 8,114,113 B2 | 2/2012 | Becker | |
| 8,137,375 B2 | 3/2012 | Hudson et al. | |
| 8,142,422 B2 | 3/2012 | Makower et al. | |
| 8,146,400 B2 | 4/2012 | Goldbar et al. | |
| 8,172,828 B2 | 5/2012 | Chang et al. | |
| 8,277,478 B2 | 10/2012 | Drontle et al. | |
| 8,282,667 B2 | 10/2012 | Drontle et al. | |
| 8,317,816 B2 | 11/2012 | Becker | |
| 8,394,400 B2 | 3/2013 | Bourne et al. | |
| D679,803 S | 4/2013 | Carter | |
| 8,414,473 B2 | 4/2013 | Jenkins et al. | |
| 8,425,457 B2 | 4/2013 | John et al. | |
| 8,506,589 B2 | 8/2013 | Maloney | |
| 8,529,546 B2 | 9/2013 | Alvarez | |
| 8,568,438 B2 | 10/2013 | Burbank et al. | |
| 8,585,728 B2 | 11/2013 | Keith et al. | |
| 8,585,729 B2 | 11/2013 | Keith et al. | |
| 8,623,043 B1 | 1/2014 | Keith et al. | |
| 8,657,846 B2 | 2/2014 | Keith et al. | |
| 8,715,169 B2 | 5/2014 | Chang et al. | |
| 8,721,591 B2 | 5/2014 | Chang et al. | |
| 8,740,844 B2 | 6/2014 | Freyman et al. | |
| 8,747,389 B2 | 6/2014 | Goldfarb et al. | |
| 8,764,709 B2 | 7/2014 | Chang et al. | |
| 8,764,726 B2 | 7/2014 | Chang et al. | |
| 8,764,729 B2 | 7/2014 | Muni et al. | |
| 8,764,786 B2 | 7/2014 | Becker | |
| 8,777,926 B2 | 7/2014 | Chang et al. | |
| 8,833,373 B2 | 9/2014 | Barodka | |
| 8,834,513 B2 | 9/2014 | Hanson et al. | |
| 8,858,586 B2 | 10/2014 | Chang et al. | |
| 8,864,746 B2 | 10/2014 | Becker | |
| 8,888,686 B2 | 11/2014 | Drontle et al. | |
| 8,894,614 B2 | 11/2014 | Muni et al. | |
| 8,905,922 B2 | 12/2014 | Makower et al. | |
| 8,915,938 B2 | 12/2014 | Keith et al. | |
| 8,936,612 B2 | 1/2015 | Suehara | |
| 8,951,225 B2 | 2/2015 | Evard et al. | |
| 8,968,269 B2 | 3/2015 | Becker | |
| 9,011,412 B2 | 4/2015 | Albritton, IV et al. | |
| 9,050,440 B2 | 6/2015 | Becker | |
| 9,089,258 B2 | 7/2015 | Goldfarb et al. | |
| 9,095,646 B2 | 8/2015 | Chow et al. | |
| 9,101,384 B2 | 8/2015 | Makower et al. | |
| 9,101,430 B2 | 8/2015 | Müller et al. | |
| 9,101,739 B2 | 8/2015 | Lesch, Jr. et al. | |
| 9,107,687 B2 | 8/2015 | Kinoshita et al. | |
| 9,167,961 B2 | 10/2015 | Makower et al. | |
| 9,192,748 B2 | 11/2015 | Ressemann et al. | |
| 9,199,058 B2 | 12/2015 | Lentz | |
| 9,204,893 B2 | 12/2015 | Rizk et al. | |
| 9,220,879 B2 | 12/2015 | Chang et al. | |
| 9,226,800 B2 | 1/2016 | Burg et al. | |
| 9,248,266 B2 | 2/2016 | Chandler et al. | |
| 9,282,986 B2 | 3/2016 | Hanson et al. | |
| 9,339,637 B2 | 5/2016 | Drontle et al. | |
| 9,370,649 B2 | 6/2016 | Chang et al. | |
| 9,370,650 B2 | 6/2016 | Hanson et al. | |
| 9,399,121 B2 | 7/2016 | Goldfarb et al. | |
| 9,457,175 B2 | 10/2016 | Becker | |
| 9,463,307 B2 | 10/2016 | Vaccaro et al. | |
| 9,486,614 B2 | 11/2016 | Drontle et al. | |
| 9,498,239 B2 | 11/2016 | Schreck et al. | |
| 9,510,743 B2 | 12/2016 | Chandler et al. | |
| 9,550,049 B2 | 1/2017 | Hanson et al. | |
| 9,554,691 B2 | 1/2017 | Goldfarb et al. | |
| 9,554,817 B2 | 1/2017 | Goldfarb et al. | |
| 9,572,954 B2 | 2/2017 | Pinchuk et al. | |
| 9,579,448 B2 | 2/2017 | Chow et al. | |
| 9,603,506 B2 | 3/2017 | Goldfarb et al. | |
| 9,610,428 B2 | 4/2017 | Muni et al. | |
| 9,649,477 B2 | 5/2017 | Muni et al. | |
| 9,687,263 B2 | 6/2017 | Schreck et al. | |
| 9,694,163 B2 | 7/2017 | Chandler et al. | |
| 9,700,326 B2 | 7/2017 | Morriss et al. | |
| 9,700,705 B2 | 7/2017 | Lesch, Jr. et al. | |
| 9,700,706 B2 | 7/2017 | Becker | |
| 9,713,700 B2 | 7/2017 | Chang et al. | |
| 9,757,018 B2 | 9/2017 | Kesten et al. | |
| 9,770,577 B2 | 9/2017 | Li et al. | |
| 9,775,975 B2 | 10/2017 | Ressemann et al. | |
| 9,820,688 B2 | 11/2017 | Jenkins et al. | |
| 9,827,367 B2 | 11/2017 | Perry et al. | |
| 9,833,130 B2 | 12/2017 | Schaeffer et al. | |
| 9,839,347 B2 | 12/2017 | Chandler et al. | |
| 9,931,026 B2 | 4/2018 | Ha et al. | |
| 9,955,852 B2 | 5/2018 | Kesten et al. | |
| 9,987,025 B2 | 6/2018 | Becker | |
| 9,999,752 B2 | 6/2018 | Becker | |
| 10,004,863 B2 | 6/2018 | Vazales et al. | |
| 10,016,580 B2 | 7/2018 | Chandler et al. | |
| 10,022,525 B2 | 7/2018 | Hanson et al. | |
| 10,034,682 B2 | 7/2018 | Muni et al. | |

(56) References Cited

U.S. PATENT DOCUMENTS

| | | |
|---|---|---|
| 10,065,028 B2 | 9/2018 | Liberatore et al. |
| 10,085,889 B2 | 10/2018 | Chan et al. |
| 10,098,652 B2 | 10/2018 | Goldfarb et al. |
| 10,124,154 B2 | 11/2018 | Evard et al. |
| 10,137,285 B2 | 11/2018 | Jenkins et al. |
| 10,143,591 B2 | 12/2018 | Ha et al. |
| 10,154,850 B2 | 12/2018 | Janjua |
| 10,166,369 B2 | 1/2019 | Jenkins et al. |
| 10,179,002 B2 | 1/2019 | Wasicek et al. |
| 10,179,227 B2 | 1/2019 | Lam et al. |
| 10,183,153 B2 | 1/2019 | Kesten et al. |
| 10,188,413 B1 | 1/2019 | Morriss et al. |
| 10,206,821 B2 | 2/2019 | Campbell et al. |
| 10,238,845 B2 | 3/2019 | Ha et al. |
| 10,244,935 B2 | 4/2019 | Ha et al. |
| 10,271,719 B2 | 4/2019 | Morriss et al. |
| 10,271,871 B2 | 4/2019 | Palushi et al. |
| 10,300,257 B2 | 5/2019 | Wu et al. |
| 10,307,519 B2 | 6/2019 | Drontle et al. |
| 10,322,269 B1 | 6/2019 | Arrieta et al. |
| 10,335,319 B2 | 7/2019 | Wasicek et al. |
| 10,350,396 B2 | 7/2019 | Chan et al. |
| 10,362,965 B2 | 7/2019 | Kesten et al. |
| 10,363,402 B2 | 7/2019 | Drontle et al. |
| 10,376,416 B2 | 8/2019 | Clifford et al. |
| 10,383,992 B2 | 8/2019 | Goldfarb et al. |
| 10,426,925 B2 | 10/2019 | Schaeffer |
| 10,441,758 B2 | 10/2019 | Muni et al. |
| 10,456,519 B2 | 10/2019 | Ngo-Chu |
| 10,463,242 B2 | 11/2019 | Kesten et al. |
| 10,485,609 B2 | 11/2019 | Palushi et al. |
| 10,492,810 B2 | 12/2019 | Chang et al. |
| 10,493,251 B2 | 12/2019 | Ha et al. |
| 10,500,380 B2 | 12/2019 | Chang et al. |
| 10,507,310 B2 | 12/2019 | Matlock et al. |
| 10,512,763 B2 | 12/2019 | Jenkins et al. |
| 10,512,764 B2 | 12/2019 | Ngo-Chu et al. |
| 10,517,608 B2 | 12/2019 | Jenkins et al. |
| 10,524,814 B2 | 1/2020 | Chang et al. |
| 10,524,869 B2 | 1/2020 | Jenkins et al. |
| 10,549,076 B2 | 2/2020 | Kesten et al. |
| 10,561,829 B2 | 2/2020 | Hanson et al. |
| 10,569,060 B2 | 2/2020 | Jenkins et al. |
| D877,325 S | 3/2020 | Arrieta et al. |
| 10,589,072 B2 | 3/2020 | Chandler et al. |
| 10,602,966 B2 | 3/2020 | Makower |
| 10,603,472 B2 | 3/2020 | Gliner et al. |
| 10,610,308 B2 | 4/2020 | Sema et al. |
| 10,625,062 B2 | 4/2020 | Matlock et al. |
| 10,631,756 B2 | 4/2020 | Kim et al. |
| 10,631,890 B2 | 4/2020 | Palushi et al. |
| 10,639,457 B2 | 5/2020 | Becker |
| 10,639,462 B2 | 5/2020 | Matlock et al. |
| 10,646,701 B2 | 5/2020 | Ressemann et al. |
| 10,682,503 B2 | 6/2020 | Gerrans et al. |
| 10,687,690 B2 | 6/2020 | Kesten et al. |
| 10,695,080 B2 | 6/2020 | Chang et al. |
| 10,695,537 B2 | 6/2020 | Muni et al. |
| 10,702,295 B2 | 7/2020 | Jenkins et al. |
| 10,709,880 B2 | 7/2020 | Johnson et al. |
| 10,716,629 B2 | 7/2020 | Goldfarb et al. |
| 10,716,709 B2 | 7/2020 | Morriss et al. |
| 10,722,109 B2 | 7/2020 | Kermani |
| 10,736,647 B2 | 8/2020 | Palushi et al. |
| 10,736,784 B2 | 8/2020 | Ngo-Chu et al. |
| 10,772,489 B2 | 9/2020 | Govari et al. |
| 10,779,752 B2 | 9/2020 | Kim et al. |
| 10,779,891 B2 | 9/2020 | Clopp |
| 10,786,311 B2 | 9/2020 | Salazar et al. |
| 10,806,477 B2 | 10/2020 | Goldfarb et al. |
| 10,806,849 B2 | 10/2020 | Newhauser, Jr. et al. |
| 10,813,547 B2 | 10/2020 | Makower et al. |
| 10,835,327 B2 | 11/2020 | Palushi et al. |
| 10,835,723 B2 | 11/2020 | Hanson et al. |
| 10,842,978 B2 | 11/2020 | Evard et al. |
| 10,856,727 B2 | 12/2020 | Goldfarb et al. |
| 10,857,333 B2 | 12/2020 | Ngo-Chu et al. |
| 10,864,046 B2 | 12/2020 | Salazar et al. |
| 10,874,838 B2 | 12/2020 | Goldfarb et al. |
| 10,874,839 B2 | 12/2020 | Matlock et al. |
| 10,898,693 B2 | 1/2021 | Gerrans et al. |
| 10,905,820 B2 | 2/2021 | Chow et al. |
| 11,331,460 B1 | 5/2022 | Arrieta et al. |
| 2004/0127850 A1 | 7/2004 | Steadham et al. |
| 2004/0131808 A1 | 7/2004 | Schoenle et al. |
| 2004/0254528 A1 | 12/2004 | Adams et al. |
| 2005/0113859 A1 | 5/2005 | Elliott et al. |
| 2006/0063973 A1 | 3/2006 | Makower et al. |
| 2006/0271091 A1* | 11/2006 | Campbell ............ A61M 25/104 606/192 |
| 2007/0244550 A1 | 10/2007 | Eidenschink |
| 2008/0091067 A1 | 4/2008 | Dollar |
| 2008/0172038 A1 | 7/2008 | Dollar et al. |
| 2009/0076439 A1 | 3/2009 | Dollar et al. |
| 2009/0076446 A1 | 3/2009 | Dubuclet, IV et al. |
| 2009/0088728 A1 | 4/2009 | Dollar et al. |
| 2009/0198216 A1 | 8/2009 | Muni et al. |
| 2010/0087709 A1 | 4/2010 | Bertolero et al. |
| 2010/0234724 A1 | 9/2010 | Jacobsen et al. |
| 2011/0112512 A1 | 5/2011 | Muni et al. |
| 2011/0152788 A1 | 6/2011 | Hotter |
| 2011/0270081 A1 | 11/2011 | Burg et al. |
| 2012/0053404 A1 | 3/2012 | Schreck et al. |
| 2013/0041463 A1 | 2/2013 | Ressemann |
| 2013/0066358 A1 | 3/2013 | Nalluri et al. |
| 2013/0253632 A1 | 9/2013 | Schreck |
| 2013/0261550 A1 | 10/2013 | Edgren et al. |
| 2014/0018732 A1* | 1/2014 | Bagaoisan ........ A61M 25/0136 604/95.04 |
| 2014/0031852 A1 | 1/2014 | Edgren et al. |
| 2014/0031853 A1 | 1/2014 | Suehara |
| 2014/0107427 A1 | 4/2014 | Chow et al. |
| 2014/0213968 A1 | 7/2014 | Vaccaro et al. |
| 2014/0277058 A1 | 9/2014 | Wu |
| 2016/0270863 A1 | 9/2016 | Makower |
| 2016/0287059 A1 | 10/2016 | Ha et al. |
| 2016/0310041 A1 | 10/2016 | Jenkins et al. |
| 2018/0110407 A1 | 4/2018 | Makower et al. |

FOREIGN PATENT DOCUMENTS

| | | |
|---|---|---|
| WO | WO 2010/056879 | 5/2010 |
| WO | WO 2013/179217 | 12/2013 |
| WO | WO 2017/000582 | 1/2017 |
| WO | WO 2018/146694 | 8/2018 |
| WO | WO 2019/034932 | 2/2019 |
| WO | WO 2019/123319 | 6/2019 |
| WO | WO 2019/209682 | 10/2019 |
| WO | WO 2019/234537 | 12/2019 |
| WO | WO 2020/221882 | 11/2020 |
| WO | WO 2020/221885 | 11/2020 |
| WO | WO 2021/038484 | 3/2021 |

OTHER PUBLICATIONS

Gottmann, et al., Successful Treatment of Recurrent Post-Operative Frontal Sinus Stenoses by Balloon Dilatation, CIRSE Abstract and Presentation (Oct. 5, 2002).

Gutman, et al., The Use Of The Foley Catheter In The Treatment Of Zygomatic Bone Fractures, Brit. J. oral Surg., vol. 2, pp. 153-157 (1964).

Jackson, et al., Balloon Technic For Treatment Of Fractures Of The Zygomatic Bone, J. oral Surg., vol. 14, pp. 14-19 (Jan. 1956).

Lanza, M.D., Donald C., "Postoperative Care and Avoiding Frontal Recess Stenosis", The International Advanced Sinus Symposium, Phila., PA, Jul. 1993 (2 page).

Podoshin, et al., Balloon Techniques for Treatment of Frontal Sinus Fractures, Journal of Laryngology and Otology, vol. 81, pp. 1157-1161 (Oct. 1967).

(56) References Cited

OTHER PUBLICATIONS

International Search Report and Written Opinion for International Application No. PCT/US2020/035738, Notification mailed Aug. 31, 2020.

* cited by examiner

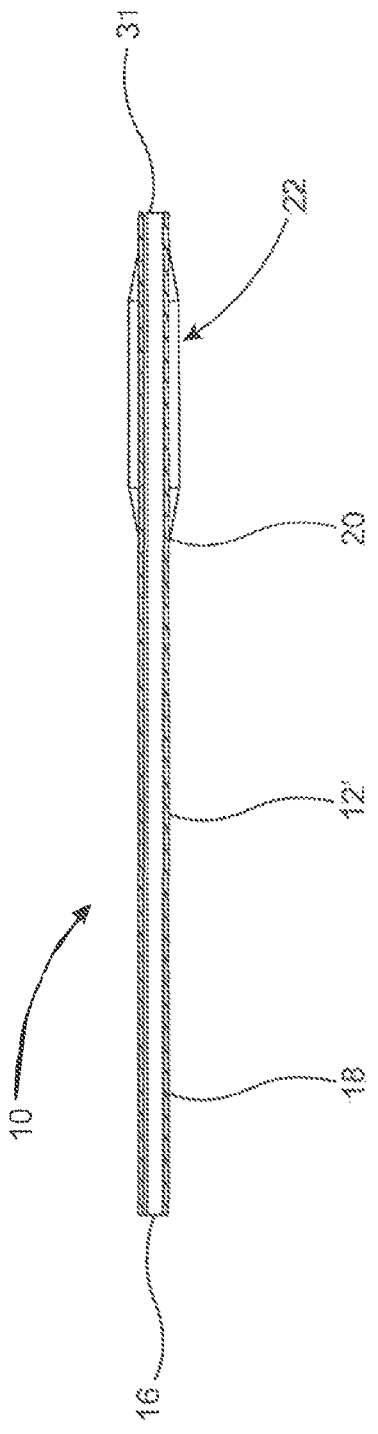
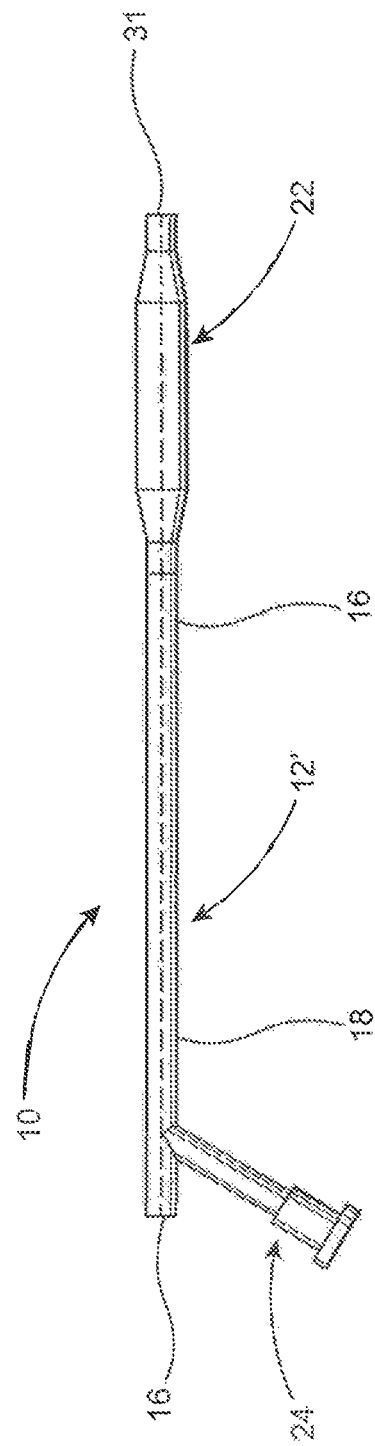

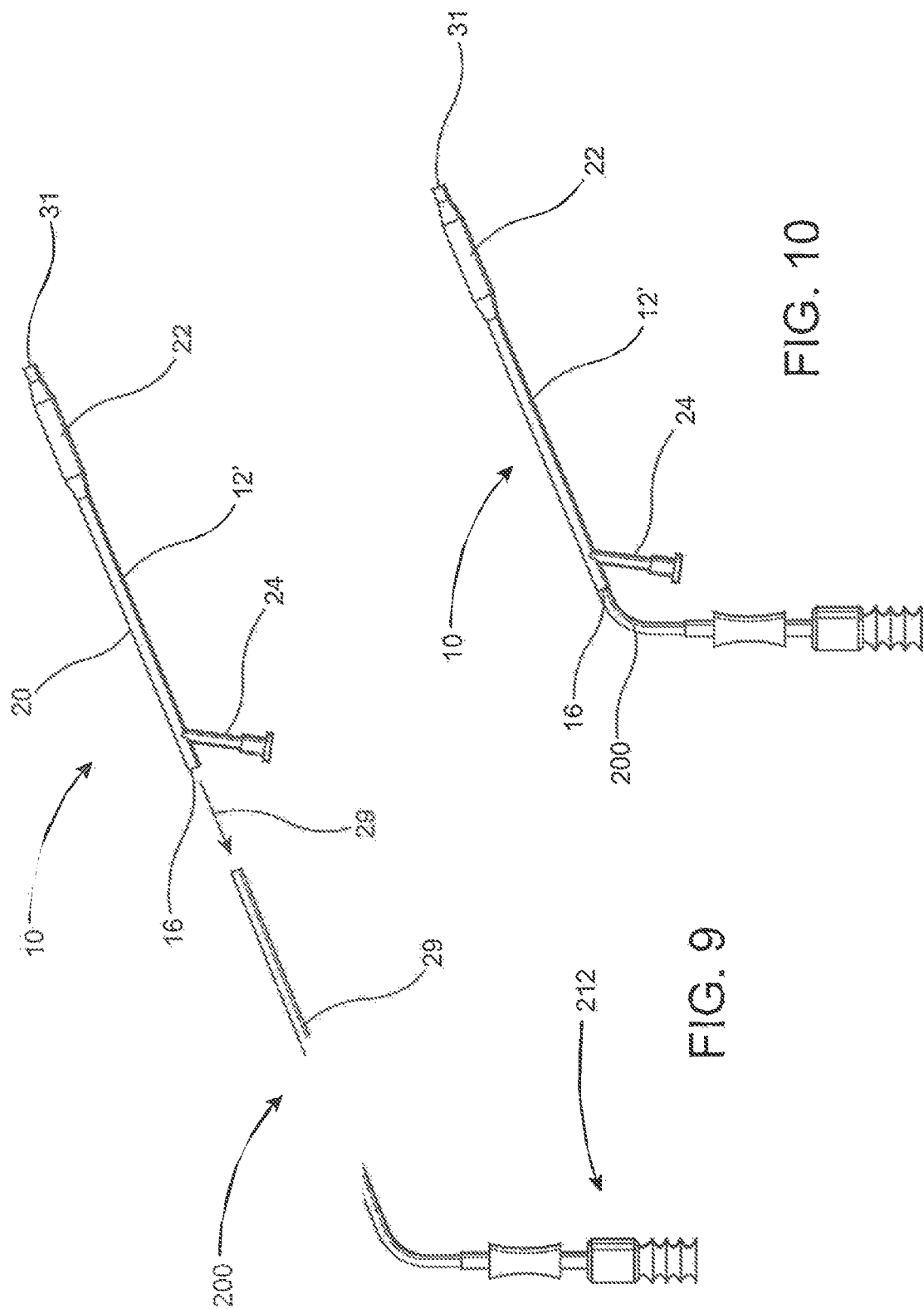

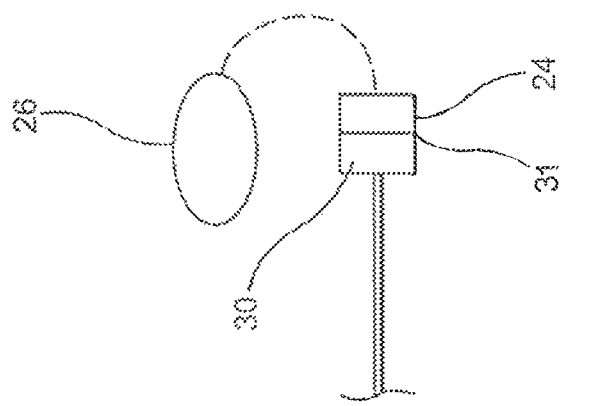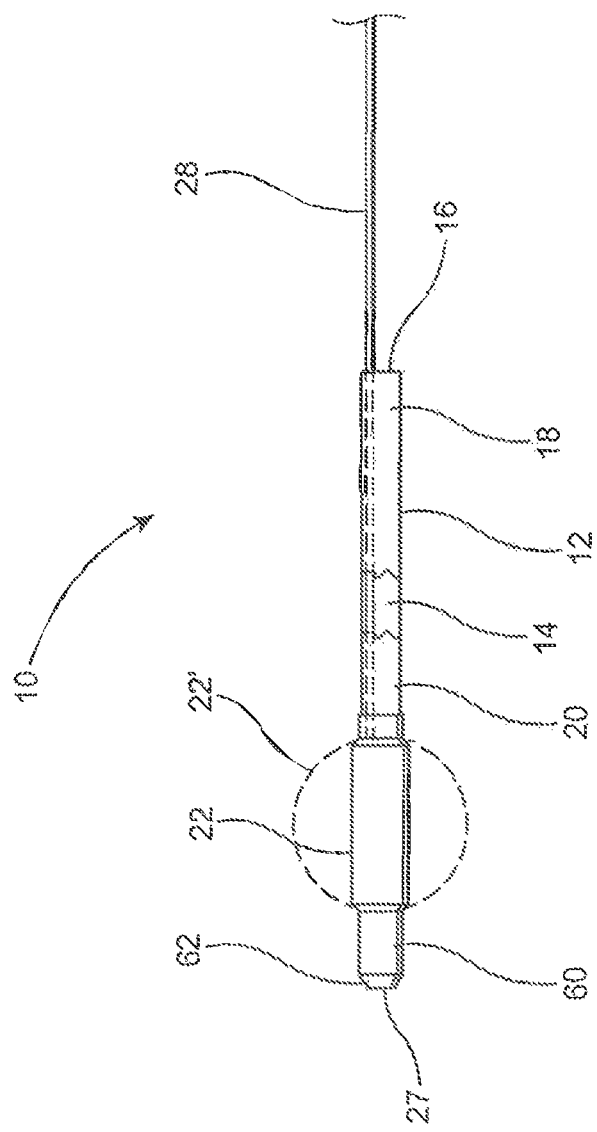
FIG. 11

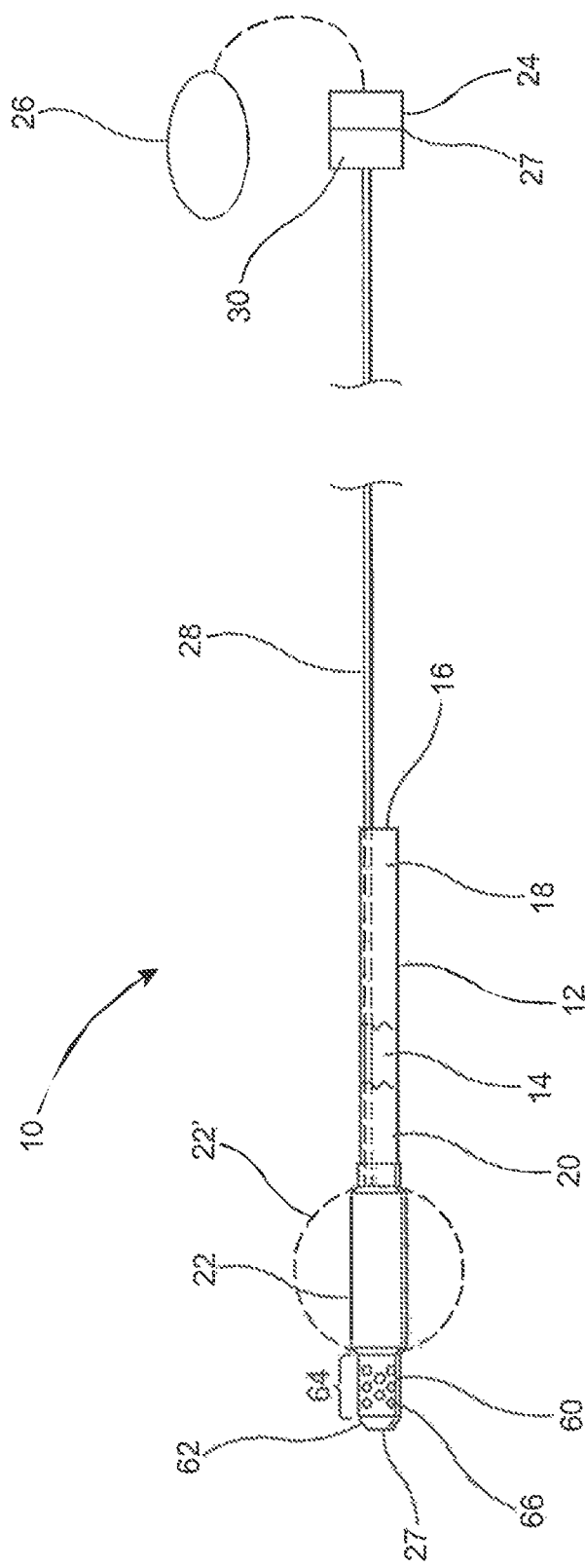

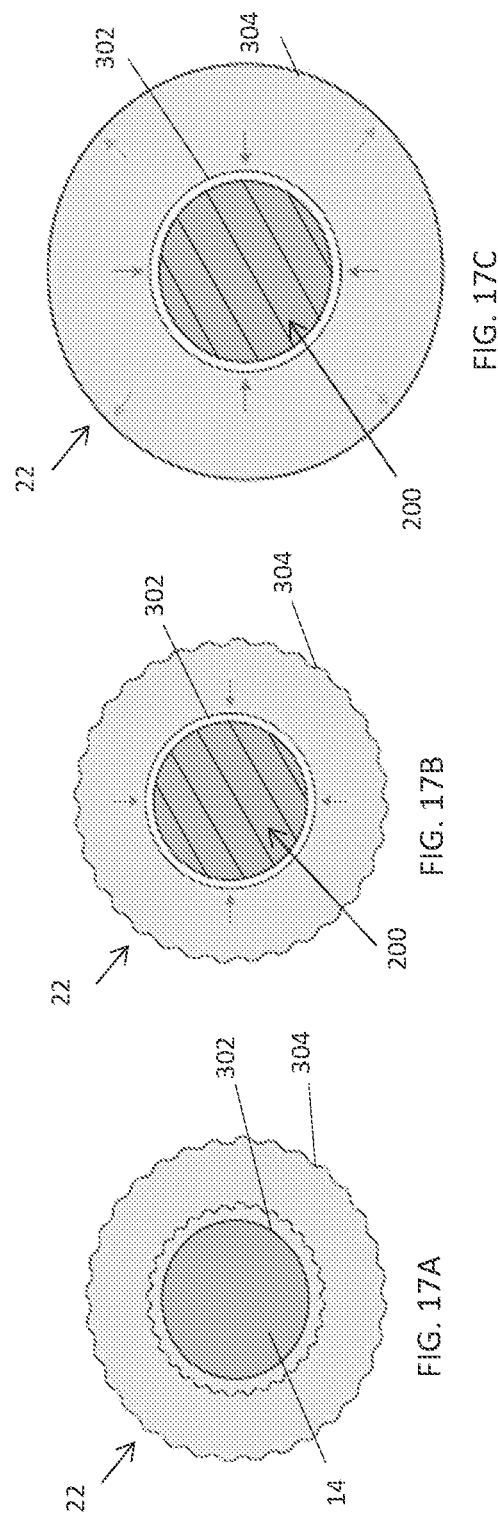

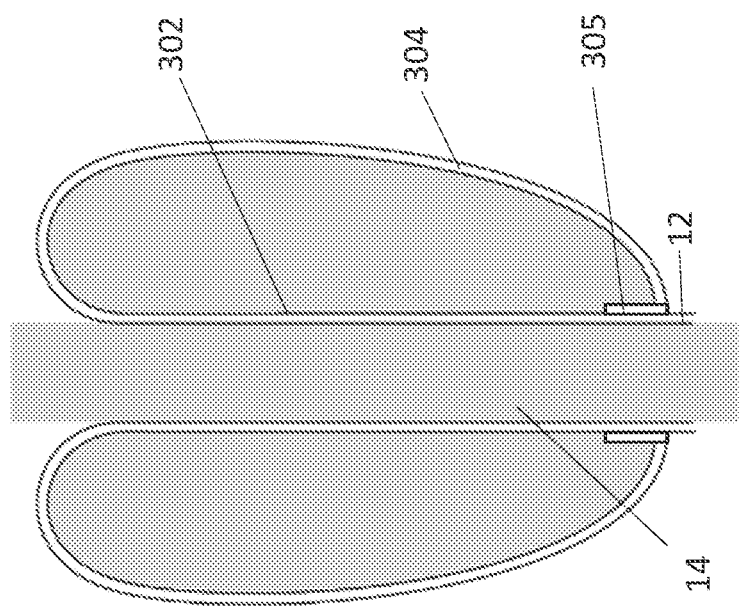
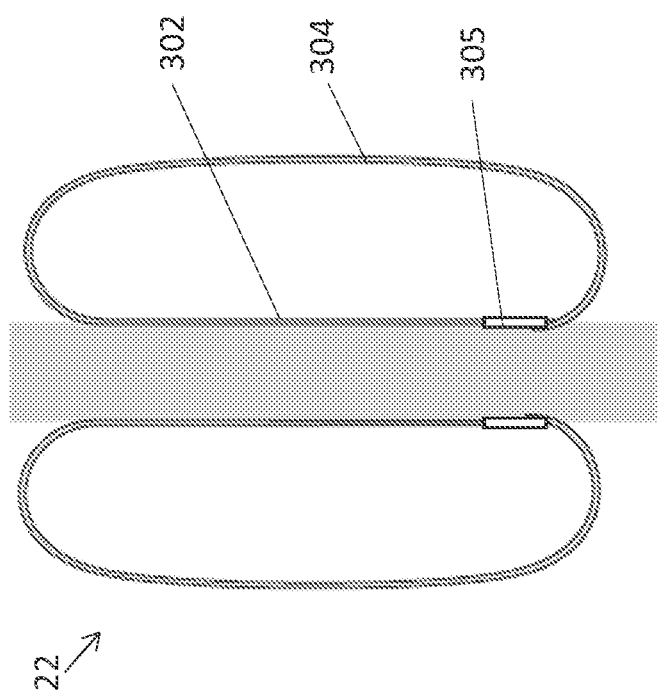

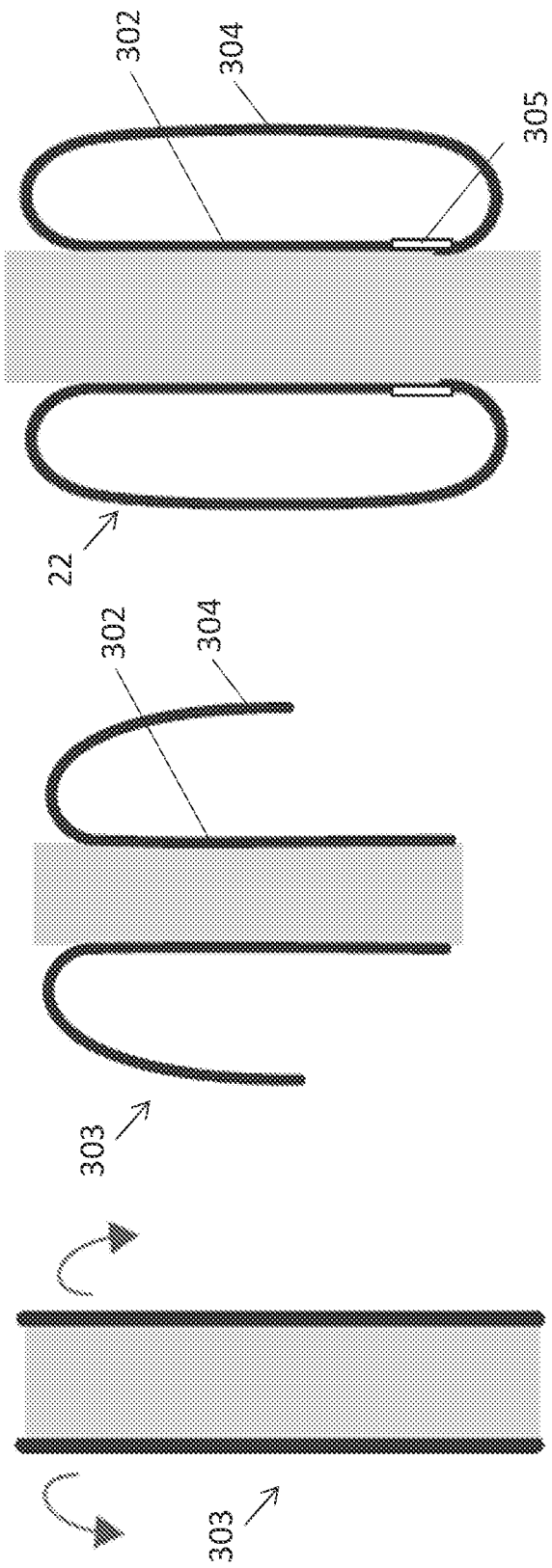

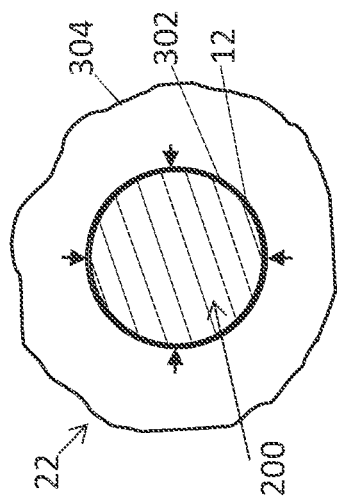
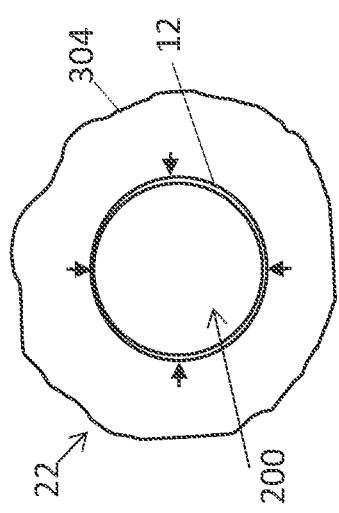
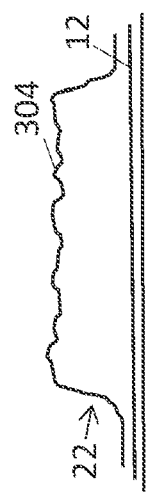
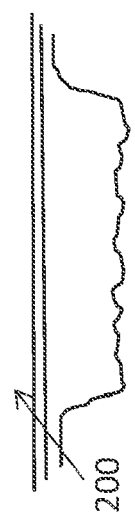

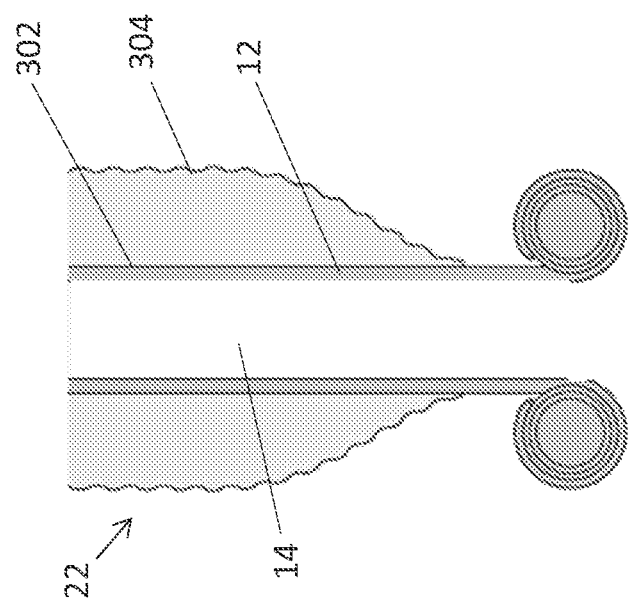
FIG. 19-D

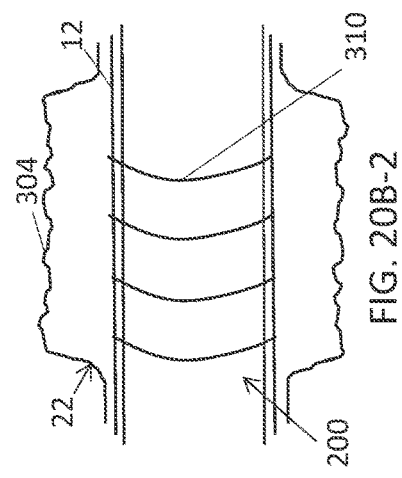
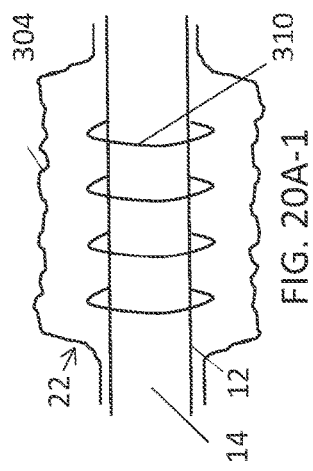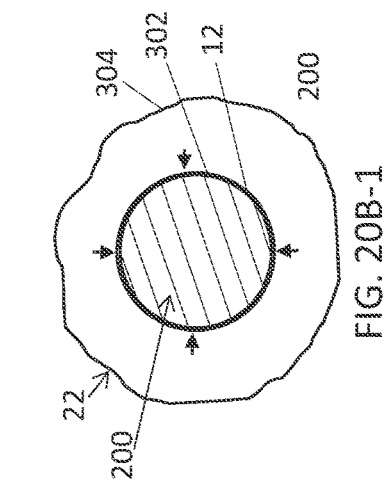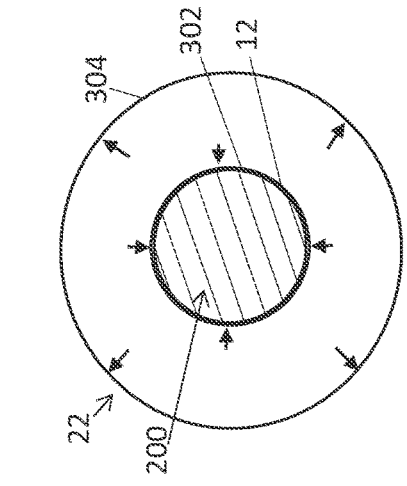

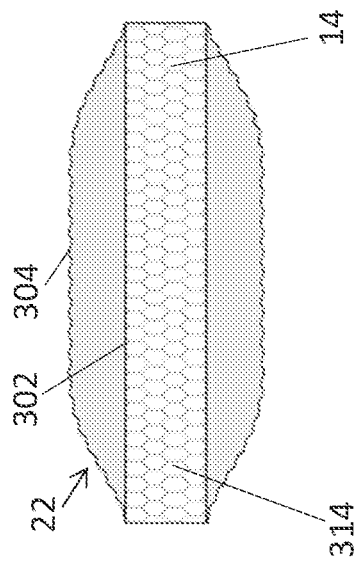
FIG. 22A-1
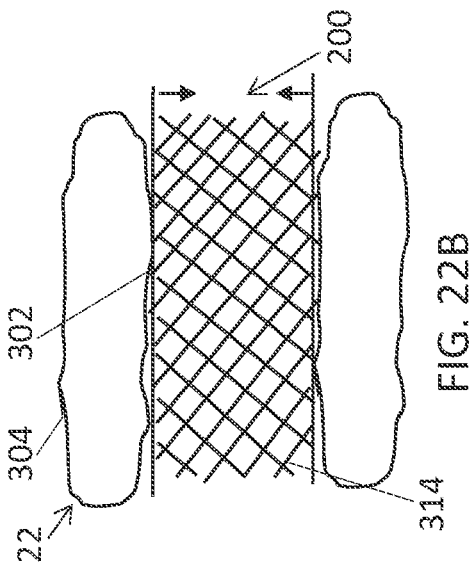
FIG. 22A-1-A
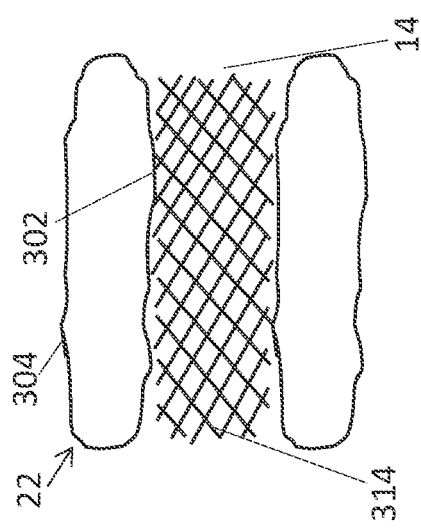
FIG. 22A-2
FIG. 22B

BALLOON DILATION DEVICE

CROSS-REFERENCE TO RELATED APPLICATIONS

This application is a U.S. national phase application under 35 U.S.C. § 371 of International Patent Application No. PCT/US2020/035738, filed Jun. 2, 2020, which claims priority under 35 U.S.C. § 119(e) to U.S. Provisional Patent Application No. 62/859,937, filed Jun. 11, 2019, which is incorporated herein by reference in its entirety.

BACKGROUND

Field of the Invention

Embodiments of the invention are directed to a dilator device comprising a flexible material, hollow sleeve, or sheath having an expandable bladder on a proximal portion thereof. The sleeve and bladder is structured to be disposed in an operative position relative to a dilation site by inserting any one of a plurality of different positioning instruments within the hollow interior.

Description of the Related Art

Paranasal sinuses of the human body comprise a plurality of right and left sinus cavities including frontal, ethmoid, sphenoid and maxillary sinus cavities. The maxillary sinuses are the largest and most common site for sinus infection. In addition, the paranasal sinuses are lined with mucus-producing tissue that is in communicating relation with the nasal cavity. Mucus produced by the indicated tissue slowly drains out of each sinus through an opening or ostium. If the mucus draining tissue of a corresponding passageway becomes inflamed, the corresponding cavities through the passageways can become blocked. Such blockage interferes with the drainage of mucous typically resulting in occlusion of the sinus ostium and mucosal congestion within the paranasal sinuses. Chronic congestion, of this type, within the sinuses can cause damage to the tissue that lines the sinus and a resulting sinus infection.

The term "sinusitis" refers generally to any inflammation or infection of the paranasal sinuses caused by bacteria, viruses, mold, allergies or combination of such factors. In more practical terms, it is estimated that chronic sinusitis results in millions of individuals visiting physician's offices on a yearly basis in the United States. Further, individuals suffering from sinusitis typically experience at least some symptoms including, but not limited to, headaches, facial pain, nasal congestion, difficulty in breathing and pain in the oral cavity. In situations where sinusitis cannot be successfully treated with antibiotics, decongestants and steroid nasal sprays, other procedures including catheter-based interventions are sometimes utilized. Accordingly, relief from such symptoms and causal factors includes restoring blocked mucus flow. As set forth above, various methods and devices for treatment of sinusitis and other conditions involving blocked mucus are known and include the dilating of the sinus ostia with various types of dilator devices. Typically, such devices are inserted trans-nasally or by a trans-canine fossa approach.

In various medical procedures including, but not limited to, the dilation of the paranasal sinus areas dilation devices, including balloon catheters, have been used. Expandable catheters have been available for many years. However, in recent years additional development has been directed to the utilization, application, and design of detachable catheters capable of being used in various medical procedures. In use, the catheter or other positioning instrument may be integrally associated with the expandable or inflatable devices designed and structured to be passed along a sometimes circuitous path to reach the site intended to be dilated.

However, one problem associated with conventional and/or known devices of this type include the reliable maintenance of the dilator device in an inflated or expanded condition after it is in position. Moreover, the inflator device must be reliably sealed while allowing it to be detached from the positioning instrument. Further, it is frequently desired to maintain and intended operative position of the dilator device for a relatively extended time without damaging it or the surrounding tissue. It is recognized that while known instrumentation of this type may be at least minimally successful for accomplishing the intended result, challenges relating to the design, manufacture, and use of a simplified, inexpensive, more effective, and efficient dilator device.

Attempts to solve problems and disadvantages of the type set forth above have sometimes resulted in the use of a double lumen catheter instrument operable to detach the balloon or inflated portion from the catheter. As such, the inner catheter may be manipulated into position relative to the dilation site and the balloon or expandable portion is inflated. The outer catheter is then positioned against the base of the expansion portion and the inner catheter is pulled backwards resulting in a separation of the balloon or expansion portion from the inner catheter. At the same time included threads are disposed at the base of the expansion portion in order to maintain it in an inflated or expanded orientation. As should be apparent, instrumentation associated with a double catheter approach may be considered overly complex.

Other disadvantages with known inflation devices include the use of balloons or like expandable structures being used with only a specific positioning instrument, wherein the balloon or expandable structure may be integrated or connected directly to the specialized positioning instrument. This obviously involves the necessity of selecting different appropriate positioning instruments for each of a possible plurality of procedures or dilation sites being treated.

Accordingly, there is a need in this area for an improved dilator device which may be operatively positioned relative to an intended dilation site in a simple and efficient manner without requiring the use of specialized, integrated instrumentation. More specifically, such an improved and proposed dilating device would have the advantage of being usable with any one of a plurality of different positioning instruments. As a result the same dilator device can be used with an appropriate positioning instrument which is structured to best position the dilator device in an operative position relative to the intended dilation site.

SUMMARY

Any feature, structure, or step disclosed among the embodiments herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

Embodiments of the invention are directed to a dilator device operative to dilate or expand any of a plurality of different regions, locations, areas, etc. in an animal or human body such as, but not limited to, the paranasal sinuses, Eustachian tube, carpal ligament, ureter, heart, nervous system, or other part of a body.

In one embodiment, the dilator device comprises an elongated sleeve formed of a flexible material which includes a distal portion and a proximal portion. Moreover, the sleeve includes a hollow interior extending along at least a majority and/or the entirety of the length of the sleeve and along both the proximal and distal portions. An access opening or like structure is formed preferably on the proximal portion such as, but not limited to, the end or extremity of the proximal portion in communicating relation with a hollow interior.

In addition, a bladder is formed on or connected to the distal portion preferably at or adjacent to the distal end or extremity. Further, the bladder is capable of being inflated or otherwise expanded into an inflated or expanded orientation. When so oriented, the bladder extends radially outward from an exterior of the distal portion of the sleeve. In at least one preferred embodiment, a preferred expanded or inflated orientation of the bladder includes it transversely surrounding the sleeve, such as by extending along a transverse circumference thereof. It is emphasized that the size, configuration and disposition of the bladder, when in its expanded or inflated orientation may vary dependent, at least in part, on the area, location, or site of the body portion, to be dilated.

The versatility of the dilator device of the embodiments of the present invention is significantly enhanced by structuring it to be used in combination with any one of a plurality of different positioning instruments. As set forth above, known or conventional dilator assemblies, including those used in the medical profession, are frequently defined by both the positioning instrument and an expandable or a dilating structure assembled or designed as operatively and/or structurally integrated parts. As a result, many of the conventional dilator assemblies are not adaptable for the dilation of specific body parts. To the contrary, devices and assemblies of this type may be specifically structured or designed for use on a specific area or location of the body.

Accordingly, one or more preferred embodiments of the present invention include the aforementioned sleeve being dimensioned, configured and structured to be disposed in a sheath-like manner on or over any one of a plurality of different positioning instruments. As a result, the dilator sleeve can be used to dilate different areas or parts of the human body by being disposed in a preferred operative position relative to the dilation site by using an appropriately dimensioned, configured and/or structured positioning instrument intended to reach or approach the dilation site. Moreover, the adaptation of the dilator sleeve to different positioning instruments is facilitated by the forming of the sleeve from a material having sufficient flexibility to substantially adapt or conform to at least a portion of the positioning instrument disposed or received within the hollow interior of the sleeve. To those familiar with dilation instrumentation, it should be recognized that the positioning instrument may be substantially or at least partially semi-rigid, rigid or otherwise appropriately structured to reach an intended dilation site. In one embodiment, the positioning element is semi-rigid. In one embodiment, the positioning element is rigid. Also, the selected positioning instrument should be structured to efficiently dispose the bladder of the dilator sleeve in and appropriate, operative position to accomplish the intended dilation.

Additional structural and operative features of one or more preferred embodiments of the dilator device include the provision of a fluid input connected to the sleeve in fluid communication with the bladder. Further, the fluid input is structured for removable connection to a fluid source, which may be independent of the positioning instrument. Dependent, at least in part, on the structural and operative features of the bladder, the fluid source may be a source of gas used to expand the bladder by "inflation" or a source of liquid or other appropriate fluid used to expand the bladder. As used herein, the terms "inflate" or its equivalent may be used interchangeably with the term "expand" or its equivalent, regardless of the fluid being delivered to the interior of the bladder which cause its outward, radial extension or position. In addition, the fluid input also includes or is used in cooperation with a flow restrictor such as, but not limited to, a one-way check valve. The provision and disposition of the flow restrictor allows fluid flow from the fluid source into and through the fluid input to and into the bladder so as to facilitate its inflation and/or expansion. In addition, the flow restrictor is structured to restrict fluid flow in an opposite direction, from the bladder to an exterior of the sleeve, or other location in order to maintain the bladder in the inflated or expanded orientation. However, the flow restrictor is further structured and operative to allow a deflation or collapse of the bladder such as, but not limited to, the removal of the bladder and/or dilator device from an operative orientation relative to the area being dilated. As set forth in greater detail hereinafter, the fluid input as well as the flow restrictor may be disposed at various locations on the sleeve dependent upon the additional operative features, intended use and cooperative structuring of the sleeve.

Accordingly, one or more preferred embodiments of the dilator device may include additional structural and operative features incorporated within the dilator sleeve. More specifically, the sleeve may include a frangible portion or separable portion disposed in interconnecting relation between the distal portion and a proximal portion. The frangible or separable portion of the sleeve may include a variety of different structural configurations such as, but not limited to, a weakened seam or weakened segment line extending circumferentially or otherwise disposed in interconnecting relation between the proximal and distal portions. The frangible or separable portion is structured to facilitate a separation of the distal and proximal portions from one another when a predetermined pulling or other directed force is exerted on the proximal portion. The use of the separable embodiment(s) may be applicable in situations where it is intended or preferred to maintain the distal portion and inflated or expanded bladder in the operative position relative to the dilation site for an extended period.

Further by way of example, when the separable embodiment(s) of the sleeve is intended to dilate a portion of the nasal passage or sinus area, the bladder may be disposed in the aforementioned operative position relative to the dilation site. After expansion or inflation of the bladder, the proximal portion is cooperatively dimensioned with a remainder of the sleeve so as to be accessible for purposes of exerting the aforementioned pulling or other directed force thereon. As indicated, the exertion of such a force will cause a separation of the proximal portion from the distal portion, while leaving the expanded bladder in the operative position relative to the dilation site. Further, one or more separable embodiments of the dilator sleeve may also include a tail portion connected to the distal portion. The tail portion is further dimensioned so as to be accessible by medical personnel, possibly using appropriate instrumentation, for eventual removal of the remainder of the proximal portion and bladder, after the proximal portion has been separated or removed.

Additional features of the one or more separable embodiments of the dilator sleeve may include the aforementioned fluid input and/or flow restrictor being disposed on the distal portion or other appropriate portion of the sleeve so as to remain in communicating relation with the inflated or expanded bladder. This will assure that the bladder will continuously remain in the expanded or inflated orientation subsequent to the removal of the proximal portion, during an extended period of dilation.

In preferred embodiments according to the present invention, the elongated sleeve comprises a predetermined structural integrity that facilitates positioning the dilator device within the paranasal sinuses. The predetermined structural integrity may be at least partially defined by the elongated sleeve comprising a preferred rigidity. The preferred rigidity comprises the sleeve being sufficiently rigid to move or penetrate within the paranasal sinuses while also being sufficiently flexible to conform to the positioning instruments or to the geometry of the paranasal sinuses. The preferred rigidity may be at least partially defined by the wall thickness and the materials of the elongated sleeve. The elongated sleeve may comprise an inner layer and an outer layer. The conduit that transports the fluid that inflates the balloon may be disposed between both layers. Alternatively, the elongated sleeve may comprise a single outer layer wherein the conduit disposed substantially within the outer layer.

In some embodiments, features of the dilator device comprise a sleeve having a tip with a predetermined configuration. The predetermined configuration may be a substantially tapered configuration of the tip that facilitates positioning the sleeve within the paranasal sinuses. More specifically, the tapered configuration of the tip facilitates entry of the sleeve into smaller openings. The tip should comprise an open end of smaller size than that of the positioning instrument so that the positioning instrument does not pass there through. Instead, further movement of the positioning instrument can result in a substantially corresponding movement of the elongated sleeve.

In one embodiment, the dilator device 10 may be used in conjunction with a suction component that can exert negative pressure to an intended location. The hollow interior can be dimensioned and configured to receive therein a suction component and to permit reciprocal movement of the same within the hollow interior. Likewise, the sleeve should also be able to reciprocally move relative to the suction component. The open end should be of sufficient size so that the suction component may pass there through to reach an otherwise deeper intended location within the paranasal sinuses.

In various embodiments, a dilator device includes a navigation interface. The navigation interface may be at least partially defined as an external device that may be located on the exterior of the body. For example, the external device may be located on the face of a person, and in substantial alignment with the paranasal sinuses. The external device may be configured to substantially duplicate the movement of the dilator device by forming an at least partially operable magnetic interface with the tip of the sleeve. Accordingly, the external device may comprise a magnet while the tip may comprise a material capable of being attracted to the magnet. The magnetic interface may be used to determine or track an at least approximate position of the dilator device within the paranasal sinuses. The navigation interface may also be at least partially defined as a component observable on a variety of imaging capabilities. The tip may comprise a material that may act as a contrast agent on the particular imaging capability. For example, the tip may comprise barium sulfate which is a contrast agent that is viewable on an x-ray.

Additional features found in various embodiments of the present invention include the dilator device comprising an irrigation structure configured to provide irrigation to an intended body part. The tip may comprise an irrigation portion having at least one opening disposed in fluid communication with at least a portion of the hollow interior and configured to provide irrigation. Consequently, a fluid may pass through the hollow interior and exit through the irrigation opening(s) to irrigate the intended body part.

These and other objects, features and advantages of certain embodiments of the present invention will become clearer when the drawings as well as the detailed description are taken into consideration.

In various embodiments, a device for balloon dilation including an elongated sleeve comprising a hollow interior extending along the length thereof and a distal portion; an access opening disposed on a proximal portion of the elongated sleeve in communicating relation with the hollow interior, wherein the access opening is dimensioned to removably receive a positioning instrument therein, and wherein the elongated sleeve is configured to conform the received positioning instrument; a balloon circumferentially disposed about the distal portion of the elongate sleeve; a dilation conduit extending proximally from the elongated sleeve and fluidly connecting the balloon to a fluid input.

In one embodiment, the distal portion of the elongate sleeve comprises a resilient deformable material, wherein upon dilation, an outer diameter of the balloon expands radially outwardly and an inner diameter of the balloon inwardly deflects into the hollow interior. In one embodiment, the hollow interior comprises a substantially circular cross-section having a diameter, and the inner diameter is configured to inwardly to deflect such that the diameter of the hollow interior is reduced by at least 10%. In one embodiment, the resilient deformable material exhibits a Shore D hardness of 25D to 72D. In one embodiment, the resilient deformable material comprises a polyether block amide copolymer. In one embodiment, the hollow interior is defined at least by an interior wall that comprises a portion coated with a lubricious polymer. In one embodiment, the device further comprising a tip forming a distal end of the elongated sleeve, the tip comprising: an outer surface shaped to facilitate advancement of the elongated sleeve within a lumen of the body; an inner surface forming a distal end of the hollow interior; and a distal access opening positioned in the tip and in communicating relation with the hollow interior. In one embodiment, the inner surface of the tip comprises a conical taper narrowing to the distal access opening. In one embodiment, the conical taper comprises surface elements configured to engage the positioning instrument. In one embodiment, the tip comprises a radiopaque material. In one embodiment, the distal access opening is sized to permit passage of a suction component therethrough. In one embodiment, the conical taper of the inner surface of the tip and distal access opening are dimensioned and configured to sealably engage a suctioning component positioned within the hollow interior. In one embodiment, the device further comprising an inflator configured to fluidly couple with the inflation port. In one embodiment, the inward deflection of the inner diameter of the balloon is configured to fixedly couple at least one of the balloon and elongated sleeve to the positioning instrument. In one embodiment, the device comprising an inner balloon disposed within the hollow interior of the elongate sleeve, and wherein an inner diameter of the inner balloon is configured to receive the positioning instrument. In one embodiment, the inner balloon is positioned concentrically with the balloon. In one embodiment, the inner balloon, balloon, and elongate sleeve are fixedly coupled to each other. In one embodiment, the inner diameter of the inner balloon, upon dilation, deflects radially inward such that the inner diameter is configured to fixedly couple the inner balloon to the receiving instrument. In one embodiment, the elongate sleeve is made of an elastic material that is configured to fixedly couple the elongate sleeve and balloon to the positioning instrument upon loading the elongate sleeve onto the positioning instrument. In one embodiment, the elongate sleeve applies a radially inward compressive force to the positioning instrument upon loading thereon. In one embodiment, the device comprising a plurality of rings that are coupled to the elongate sleeve, wherein the plurality of rings are configured to fixedly couple the sleeve and balloon to the positioning instrument. In one embodiment, the plurality of rings are made of an elastic material, and wherein the plurality of rings, when loaded onto the positioning instrument, are configured to stretch to apply a radially inward compressive force to the positioning instrument. In one embodiment, the device includes a coil coupled to the elongate sleeve, and wherein the coil is configured to fixedly couple the sleeve and balloon to the positioning instrument. In one embodiment, the coil is expanded to receive the positioning instrument by twisting the coil, and wherein releasing the coil from the expanded configuration, when positioned around the positioning instrument, is configured to cause a diameter of the coil to decrease in size such that the coil and sleeve are loaded onto the positioning instrument. In one embodiment, the device includes a braid coupled to the elongate sleeve, and wherein the braid is configured to fixedly couple the sleeve and balloon to the positioning instrument. In one embodiment, the braid is a cylindrical structure with a braided wall. In one embodiment, the braid is expanded to receive the positioning instrument by longitudinally compressing the braid, and wherein releasing the braid from the longitudinal compress, when positioned around the positioning instrument, is configured to cause a diameter of the braid to decrease in size such that the braid and sleeve are loaded onto the positioning instrument.

In various embodiments, a device for balloon dilation comprising an elongated sleeve having a hollow interior extending along the length thereof; an access opening disposed on a proximal portion of the elongated sleeve in communicating relation with the hollow interior, wherein the access opening is dimensioned to removably receive a positioning instrument therein; a balloon circumferentially disposed about the elongate sleeve; and a dilation conduit extending proximally from the elongated sleeve and fluidly connecting the balloon to a fluid input; wherein upon dilation, the bladder expands radially outward.

In one embodiment, the dilation conduit comprises a tensile strength of at least 2,000 psi. In one embodiment, the dilation conduit proximately extends at least 4 inches from an proximate end of the elongate sleeve. In one embodiment, the dilation conduit exhibits a burst strength of at least 30 atm. In one embodiment, the dilation conduit exhibits a bend radius of ¼ inch or less.

In various embodiments, a device for balloon dilation comprising a balloon comprising an inner diameter defining a hollow interior extending therethrough; and a dilation conduit extending proximally from the balloon and fluidly connecting the balloon to a fluid input; wherein upon dilation, the balloon expands radially inward and outward to reach an expanded orientation; wherein the balloon comprises an annular cross-section, an inner wall defining the inner diameter of the balloon and the hollow interior, and an outer wall defining the outer diameter of the balloon and circumferentially disposed about the inner wall; and wherein the inner wall of the balloon is more compliant to dilation than the exterior wall of the bladder. In one embodiment, the balloon is elongate.

In various embodiments, a device for balloon dilation comprising a balloon comprising an inner diameter and an outer diameter, wherein the inner diameter defines a hollow interior that is configured to receive a positioning instrument, and wherein the balloon is configured to conform to the shape of the positioning instrument; a conduit fluidically coupling the balloon to a fluid input; wherein the balloon is configured to dilate; and wherein the inner diameter is configured to fixedly couple to the positioning instrument when the positioning instrument is positioned within the hollow interior.

In one embodiment, the device includes a plurality of rings that are coupled to the balloon, wherein the plurality of rings are configured to fixedly couple the balloon to the positioning instrument. In one embodiment, the plurality of rings are made of an elastic material, and wherein the plurality of rings, when loaded onto the positioning instrument, are configured to stretch to apply a radially inward compressive force to the positioning instrument. In one embodiment, the device includes a coil coupled to the balloon, and wherein the coil is configured to fixedly couple the balloon to the positioning instrument. In one embodiment, the coil is expanded to receive the positioning instrument by twisting the coil, and wherein releasing the coil from the expanded configuration, when positioned around the positioning instrument, is configured to cause a diameter of the coil to decrease in size such that the coil and balloon are loaded onto the positioning instrument. In one embodiment, a braid is coupled to the balloon, wherein the braid is configured to fixedly couple balloon to the positioning instrument. In one embodiment, the braid is a cylindrical structure with a braided wall. In one embodiment, the braid is expanded to receive the positioning instrument by longitudinally compressing the braid, and wherein releasing the braid from the longitudinal compress, when positioned around the positioning instrument, is configured to cause a diameter of the braid to decrease in size such that the braid and balloon are loaded onto the positioning instrument. In one embodiment, the outer diameter of the balloon expands radially outward and the inner diameter expands radially inward upon dilation.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure. For a fuller understanding of the nature of embodiments of the present invention, reference should be had to the following detailed description taken in connection with the accompanying drawings in which:

FIG. 8A is a schematic representation in cross-section of yet another preferred embodiment of the dilator device.

FIG. 8B is a schematic representation of an exterior view of the embodiment of the dilator device as represented in FIG. 8A.

FIG. 9 is a schematic representation in exploded form of the embodiment of the dilator device as represented in FIG. 8 in a position to be mounted on a selected positioning instrument.

FIG. 10 is a schematic representation of the embodiment of the dilator device of FIGS. 8 and 9 mounted in an operative position on a selected positioning instrument, as also represented in FIG. 9.

FIG. 11 is a schematic representation of an exterior view of a preferred embodiment of the dilator device comprising a tip with a tapered configuration.

FIG. 15 is a schematic representation of an exterior view of a preferred embodiment of the dilator device comprising a tip with a tapered configuration and a plurality of openings.

FIG. 17A schematically illustrates a cross-section view of a balloon in an un-dilated configuration.

FIG. 17B schematically illustrates a cross-section view of the balloon of FIG. 17A positioned on a positioning instrument.

FIG. 17C schematically illustrates a cross-section view of the balloon of FIG. 17B in a dilated configuration.

FIG. 17F-1 illustrates a longitudinal section view of another balloon.

FIG. 17F-2 illustrates a longitudinal section view of another balloon.

FIGS. 17G-1 through 17G-3 illustrate steps for manufacturing the balloons of FIGS. 17F-1 and 17F-2.

FIGS. 18A and 18A-1 schematically illustrate a longitudinal section view an outer balloon coupled to a sleeve positioned around an inner balloon that is loaded on a positioning instrument.

FIGS. 18B and 18B-1 schematically illustrate a cross-section view of the outer balloon, sleeve, inner balloon, and positioning instrument of FIGS. 18A and 18A-1.

FIGS. 19A-1 and 19AA-1 illustrate a longitudinal section view of a balloon in an un-dilated configuration coupled to a sleeve.

FIGS. 19A-2 and 19AA-2 illustrate a longitudinal section view of a positioning instrument.

FIGS. 19B-1 and 19BB-1 illustrate a cross-section view of the balloon of FIG. 19A-1 positioned over the positioning instrument of FIG. 19A-2.

FIG. 19B-2 illustrates a longitudinal section view of the balloon positioned over the positioning instrument shown in FIG. 19B-1.

FIGS. 19C-1 and 19CC1 illustrate a cross-section view of the balloon positioned over the positioning instrument of FIG. 19B-1 in a dilated configuration.

FIG. 19C-2 illustrates a longitudinal section view of the balloon positioned over the positioning instrument of FIG. 19C-1.

FIG. 19-D illustrates a longitudinal section view of the balloon of FIG. 19A-1 in the process of being rolled.

FIG. 20A-1 illustrates a longitudinal section view of a balloon in an uninflated configuration coupled to a sleeve with a plurality of rings.

FIG. 20A-2 illustrates a longitudinal section view of a positioning instrument.

FIG. 20B-1 illustrates a cross-section view of the balloon of FIG. 20A-1 positioned over the positioning instrument shown in FIG. 20A-2.

FIG. 20B-2 illustrates a longitudinal section view of the balloon positioned over the positioning instrument shown in FIG. 20B-1.

FIG. 20C-1 illustrates a cross-section view of the balloon positioned over the positioning instrument of FIG. 20B-1 in a dilated configuration.

FIG. 20C-2 illustrates a longitudinal section view of the balloon positioned over the positioning instrument of FIG. 20C-1.

FIG. 21A-1 illustrates a longitudinal section view of a balloon in an un-dilated configuration coupled to a coil.

FIG. 21A-2 illustrates a longitudinal section view of a positioning instrument.

FIG. 21B-1 illustrates a longitudinal section view of the balloon of FIG. 21A-1 with the coil in an expanded configuration with the coil around the positioning instrument of FIG. 21A-2.

FIG. 21B-2 illustrates a longitudinal section view of the balloon of FIG. 21B-1 with the coil loaded onto the positioning instrument.

FIGS. 22A-1 and 22A-1-A illustrates a longitudinal section view of a balloon coupled to a braid.

FIG. 22A-2 illustrates a longitudinal section view of a positioning instrument.

FIG. 22B illustrates a longitudinal section view of the balloon of FIG. 22A-1 with the braid loaded onto the positioning instrument.

Like reference numerals refer to like parts throughout the several views of the drawings.

DETAILED DESCRIPTION OF THE PREFERRED EMBODIMENT

Figure 1:
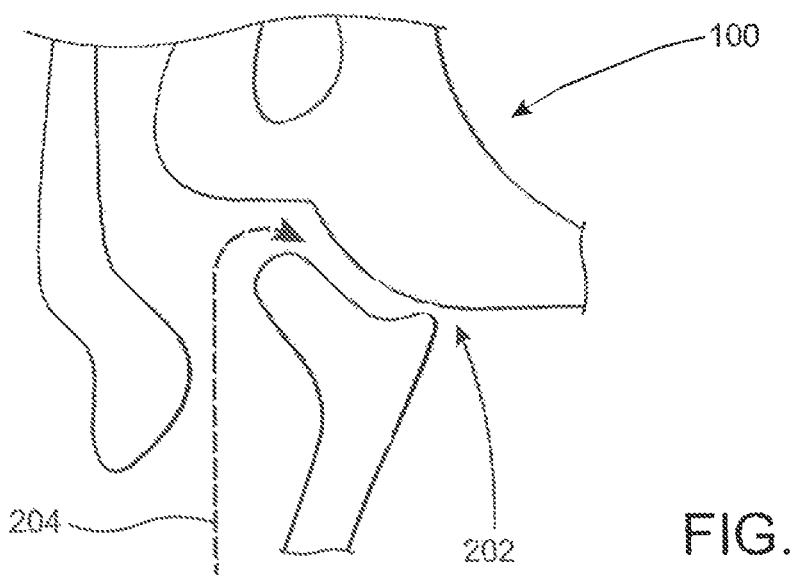
FIG. 1 is a schematic representation of a paranasal sinus area of the human body and possible dilation site.

As represented in FIGS. 1-10, various embodiments of the present invention are directed to a dilator device generally indicated as 10. As explained in greater detail hereinafter, the dilator device 10 may be used to dilate various parts of the body including, but not limited to, the paranasal sinuses 100 as schematically represented in FIG. 1.

Accordingly, the dilator device 10 includes an elongated sleeve or sheath 12 formed of a conformable, sufficiently flexible material to substantially and/or at least partially conform to and be positioned by any one of a plurality of different positioning instruments, generally indicated as 200. Further, the sleeve or sheath 12 includes a hollow interior 14 extending along at least a majority or the entirety of its length. The sleeve 12 also includes an access opening 16 preferably, but not necessarily, disposed at an end or extremity of a proximal portion 18. The sleeve 12 also includes what may be accurately described as a distal portion 20 at least partially defining the opposite end and extremity of the sleeve or sheath 12. It is also to be noted that in the embodiment of the sheath or sleeve 12, as represented in FIGS. 2-6, the outer extremity of the distal portion 20 includes a closed end 25.

Therefore, the dimensions of the access opening 16 and the hollow interior 14 as well as the overall length of the sleeve or sheath 12 allows any one of a plurality of positioning instruments 200 to be disposed within the interior 14 and extend along at least a majority of the length thereof. Further, the aforementioned flexible material from which the sleeve or sheath 12 is formed facilitates an at least partial conformance of the sleeve 12 to the exterior of the positioning instrument 200 or more specifically to a portion of the positioning instrument 200 disposed within the interior 14 and extending along the length of the sleeve 12. Such conformance of the sleeve 12 to the selected positioning instrument 200 facilitates the movement and accurate positioning of the sleeve 12, in an operative orientation, as the positioning instrument 200 and sleeve 12 move through the paranasal sinus area or other area to be dilated. From a review of the paranasal sinuses 100, as represented in FIG. 1, it is apparent that proper positioning of the sleeve 12 in the operative orientation or position relative to a dilation site such as, but not limited to, the maxillary ostium 202, may involve passage of the sleeve 12 and the positioning instrument 200 along one or more circuitous passages, schematically represented as 204. Therefore, the ability to use any one of a plurality of different positioning instruments 200 allows medical personnel to select different positioning instruments 200 having appropriate maneuverability due to their flexibility and/or other physical characteristics to accomplish an efficient disposition of the sleeve 12 relative to an intended dilation site. Accordingly, the positioning instrument 200 may have a variety of shapes and dimensions. For example, the positioning instrument 200 may have a substantially circular cross section. Other cross sectional shapes of the positioning instrument 200 may include, but are not limited to, square, rectangular, cylindrical, hexagonal, and/or other similar shapes. By way of example only, the sleeve 12 may conform a selected positioning instrument 200 having a substantially circular configuration and a diameter that may range from about 1 millimeter to about 10 millimeters.

Figure 16:
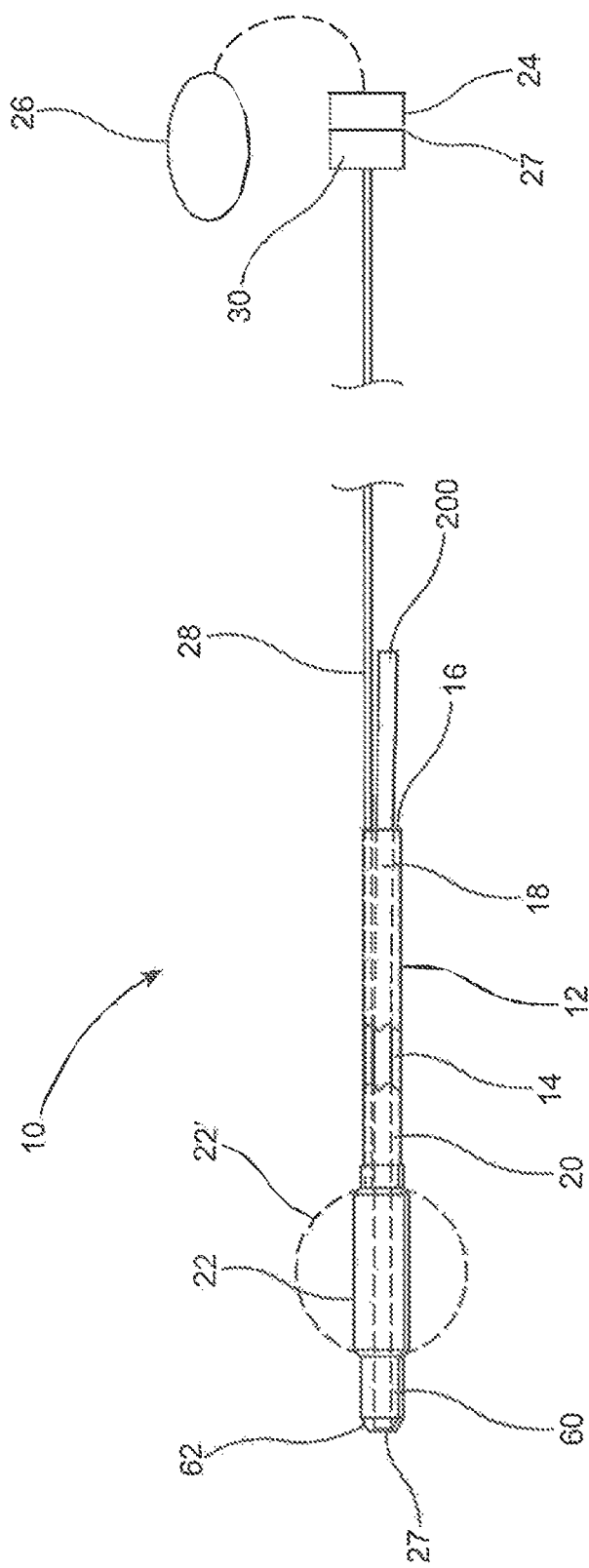
FIG. 16 is a schematic representation of an exterior view of a preferred embodiment of the dilator device similar to but distinguishable from the embodiment as represented in FIG. 11.

In preferred embodiments according to the present invention, the elongated sleeve 12 has a predetermined structural integrity that facilitates positioning the dilator device 10 within the paranasal sinuses 100, such as with a positioning instrument 200 as demonstrated in FIG. 16. Accordingly, the predetermined structural integrity of the elongated sleeve 12 may be defined as the elongated sleeve 12 comprising a preferred rigidity. The preferred rigidity as used herein refers to the elongated sleeve 12 being sufficiently rigid so as to be able to substantially penetrate or move within the paranasal sinuses 100. A preferred rigidity should be such that the sleeve 12 is not excessively rigid so as to cause damage to the paranasal sinuses 100 or so that the sleeve is unable to conform to the paranasal sinuses 100 or the positioning instrument 200. The preferred rigidity may also be defined as the sleeve 12 being sufficiently flexible so that it may at least partially conform to the particular geometry or shape of the paranasal sinuses 100. This predetermined structural integrity of the elongated sleeve 12 may be achieved by providing an elongated sleeve 12 having rigidity values between 10D and 100D as measured on the Shore D Durometer scale. More specifically, the rigidity of the sleeve 12, may fall between values of about 35D and about 72D. Favorable results have been observed with values of about 55D. Favorable results have been seen with a elongate sleeve 12 and/or distal portion 20 thereof including a resilient deformable material that exhibits a Shore D hardness of 25D to 72D. The resilient deformable material can include polymers, which can include polyether block amide copolymer.

Such preferred rigidity values as mentioned above are generally obtained, at least in part, by providing a sleeve 12 having a preferred thickness 70. Accordingly, the thickness 70 of the sleeve 12 should be less than about 0.5 millimeters. Such a thickness 70 facilitates a rigidity of the sleeve 12 that allows for at least partial conformance not only to the positioning instrument 200, but also to the geometry of the paranasal sinuses 100 so that the dilator device 10 may be easily positioned. Favorable results have been observed with a thickness 70 of the sleeve 12 between about 0.10 millimeters and 0.20 millimeters, and more specifically with a thickness of about 0.15 millimeters.

The predetermined structural integrity of the elongated sleeve 12 may be also defined, at least in part, by the materials used to form the elongated sleeve 12. As is represented in the illustrative embodiment of FIG. 13, the elongated sleeve 12 may comprise an outer layer 21 and an inner layer 23. Generally, the outer layer 21 and the inner layer 23 are connected to one another. Additionally, the outer layer 21 is disposed in at least partially enclosing relation to the inner layer 23. Either or both of the outer layer 21 and inner layer 23 may extend along the entire length of the sleeve 12 or part thereof. Alternatively, and as represented in the illustrative embodiment of FIG. 14, the sleeve 12 may comprise only an outer layer 21, and not an inner layer 23. In embodiments comprising both an outer layer 21 and an inner layer 23, the material used to form an outer layer 21 may comprise a thermoplastic elastomer such as, but not limited to, those produced under the brand Vestamid® E and Pebax®. Favorable results have been observed when Pebax® is used to form the outer layer 21. Other materials used to form the outer layer 21 may include a variety of synthetic polymers, such as, but not limited to, nylon, polyurethane, and polyamide. Conversely, the inner layer 23 may be formed by a material comprising polytetrafluoroethylene (PTFE). Other materials may also be used to form the inner layer 23 such as, but not limited to, fluorinated ethylene propylene (FEP), high-density polyethylene (HDPE) or polyethylene high-density (PEHD), and other synthetic polymers such as nylon. Favorable results have been observed by using polytetrafluoroethylene (PTFE).

As mentioned above, an alternative embodiment according to the present invention comprises a single outer layer 21. Accordingly, if there is no inner layer 23, a variety of additives may be combined with the material used for the outer layer 21. These materials may include an added lubricant, such as, but not limited to those manufactured under the brand PebaSlix®. Additionally, in embodiments comprising only a single outer layer 21, the material of the outer layer 21 may comprise a thermoplastic elastomer with a polytetrafluoroethylene (PTFE) additive.

The versatility of the sleeve 12 may be further demonstrated by having a sufficient dimension and overall structure which facilitates its use with a positioning instrument 200 incorporating a camera and/or viewing device such as, but not limited to, an endoscope/camera. As a result, the viewing, visual recording, etc. of the paranasal sinuses 100, or other area to be dilated, can be accomplished concurrent to the disposition of the sleeve 12 towards and into an operative orientation relative to the site to be dilated. Moreover, another preferred embodiment of the sleeve 12 is structured to include an open end at the extremity of the distal portion 20. As a result, visual observation and/or a direct communication is established between a selected positioning instrument 200 and an exterior of the distal portion 20, at an outer extremity thereof. This additional preferred embodiment is represented in FIGS. 8-10 and described in greater detail hereinafter.

Moreover, each of a plurality of preferred embodiments of the sleeve 12 includes an expandable and/or inflatable bladder 22, also referred to as a balloon 22, connected to, mounted on, or integrally formed with a remainder of the sleeve 12, preferably at the distal portion 20. Moreover, the expandable and/or inflatable bladder 22 may be mounted an exteriorly of the distal portion 20 and normally assume a retracted or non-expanded or non-inflated orientation 22". Alternatively, the expandable and/or inflatable bladder 22 may be mounted interiorly of the distal portion 20 and may similarly assume a retracted or non-expanded or non-inflated orientation 22". In a preferred embodiment, the bladder 22 is integrally formed or otherwise embedded with the remainder of the sleeve 12. However, an operative feature of the sleeve 12 comprises the bladder 22 being capable of expanding and/or being inflated into a radially outward extended or expanded orientation 22'. When in the expanded orientation 22', the bladder 22 preferably extends about the circumference of the sleeve 12 in substantially transversely surrounding relation to a corresponding part of the proximal portion 20. Further, when in its expanded orientation 22', the bladder 22 is further extended radially outward in substantially transverse relation to the length of the sleeve or sheath 12. More specifically, when the bladder 22 is inflated, such as in the expanded orientation 22', the bladder 22 may comprise a diameter that ranges between about 4 millimeters to about 10 millimeters, and more specifically between about 6 millimeters to about 9 millimeters. Favorable results have been observed with a bladder 22 having an inflated diameter of about 7 millimeters.

Figure 12:
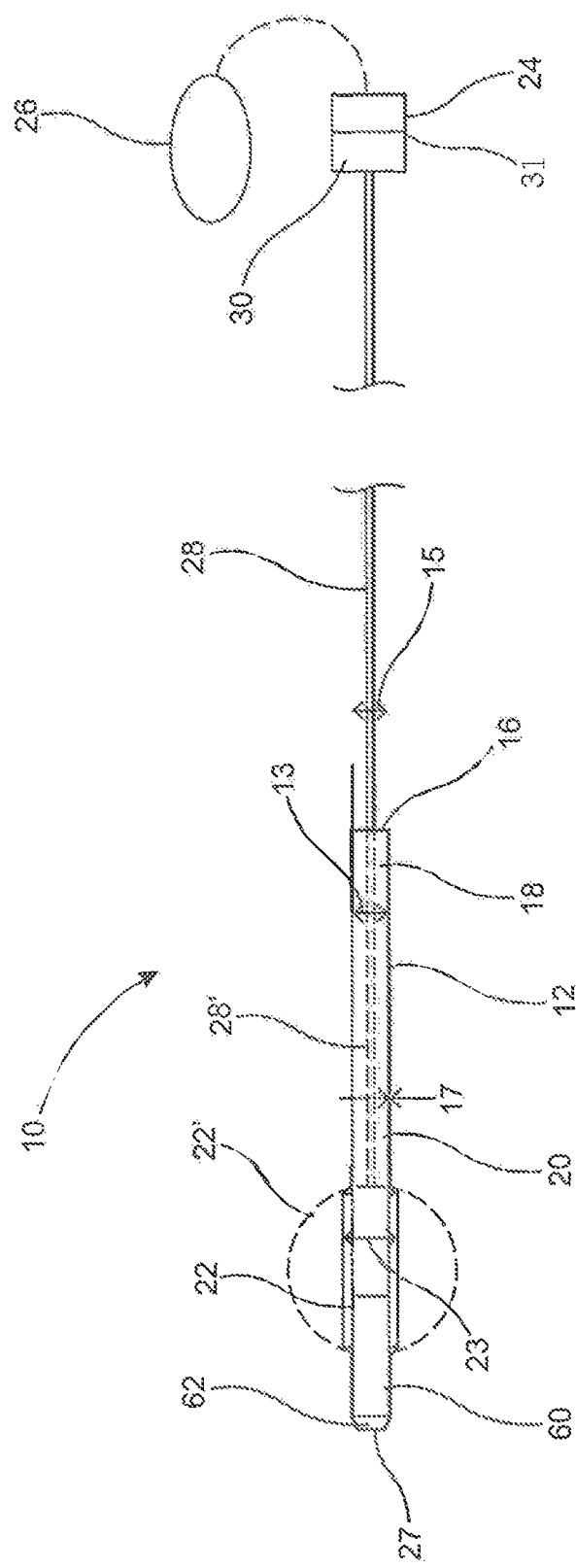
FIG. 12 is a schematic representation of a cross-section of a preferred embodiment of the dilator device comprising a tip with a tapered configuration.

Expansion and/or inflation of the bladder 22 is accomplished by the provision of a fluid input generally indicated as 24. Further, fluid input 24 is structured to be removably connected to an appropriate fluid source 26 such as, but not limited to, it could be a hand manipulated, needleless syringe. However, it is emphasized that the fluid source 26 may assume a variety of different mechanical, electrical, automatic, pre-calibrated, and/or hand manipulated devices, which are capable of being removably connected to the fluid input 24. Further, as represented in FIGS. 2 through 7B the versatility of the dilator device 10 of embodiments of the present invention are enhanced by facilitating the use of any one of a variety of different fluid sources, which are not necessarily an integrated or permanently connected part of the dilator device 10. Therefore, the fluid source 26 is operable to direct a source of fluid such as air, other gas, or other fluid through the fluid input 24 and along a fluid flow path which may be in defined at least in part by a conduit 28. As indicated, the flow path or conduit 28 is connected in fluid communication between the fluid input 24 and the interior of the bladder 22. However, as represented in FIGS. 11, 12, and 15 the fluid flow path or conduit 28 does not enter, pass into, or pass through the interior of the bladder 22. In some aspects, the conduit 28, also referred to as a inflation lumen, extends, in a proximal direction, at least 1, 2, 3, 4, 5, 6, 7, 8, 9, or 10 inches away from a proximate end of the elongate sleeve 12. Favorable results have been found with a proximal extension of at least 4 inches away from a proximate end of the elongate sleeve 12. In some aspects, the conduit 28 can exhibit a tensile strength of at least 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, or 3000 psi. Favorable results have been found with a tensile strength of at least 2,000 psi. The tensile strength psi can be measured using the standard method described in ASTM D638-14. In some aspects, the conduit 28 has a burst strength of at least 10 ATM, 20 ATM, 30 ATM, 40 ATM, or 50 ATM. Favorable results have been found with a burst strength of at least a 30 ATM. The burst strength can be measured using the standard method described in ASTM D1599-18. In some aspects, the conduit 28 can exhibit a bend radius of ⅛, ¼, ⅜, or ½ inches or less. Favorable results have been found with ¼ inch bend radius.

Figure 14:
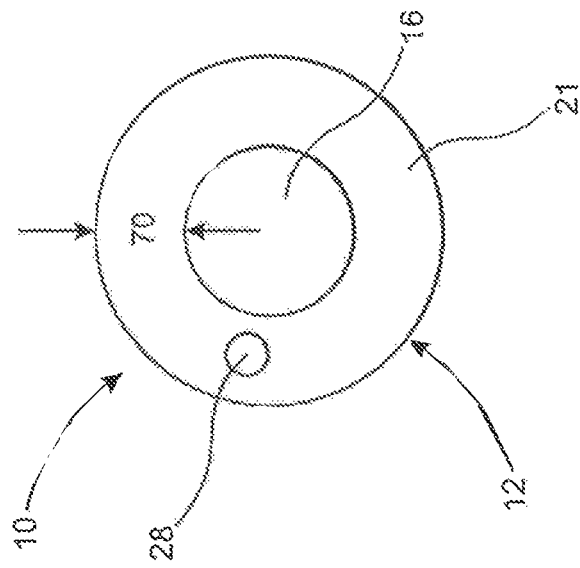
FIG. 14 is a cross-section view of a preferred embodiment of the dilator device comprising an outer layer.
Figure 13:
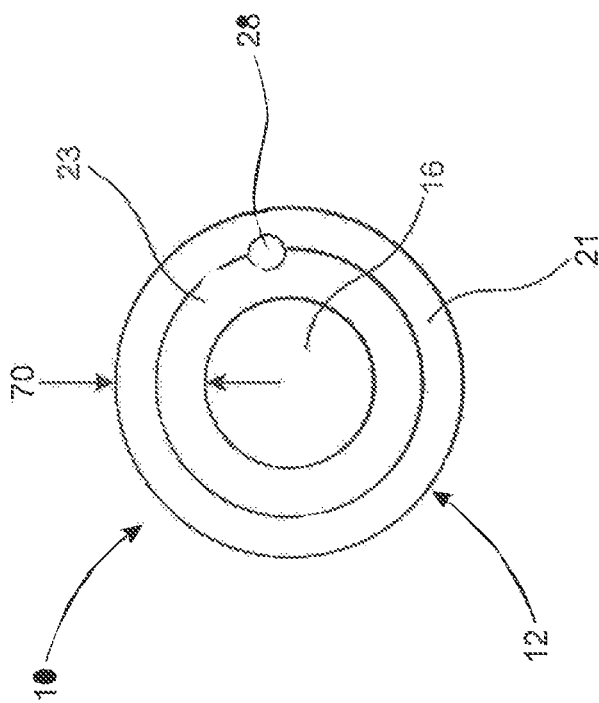
FIG. 13 is a cross-section view of a preferred embodiment of the dilator device comprising an inner layer and an outer layer.

With further reference to the illustrative embodiment as represented in FIG. 13, an enclosing relation of the outer layer 21 relative to the inner layer 23 permits disposition of the conduit 28 between both layers 23 and 21. Alternatively, and as is shown in FIG. 14, the conduit 28 may be disposed substantially within the outer layer 21. This of course differs from the above noted embodiments of FIGS. 2-6, wherein the flow path/conduit 28 is disposed on and passes along the exterior of the sleeve 12 and is connected to the exterior of the bladder 22, in fluid communication with the interior of the bladder 22, without entering or passing through the interior thereof.

As should be apparent certain instances of applying the dilator device 10 in a medical procedure involves the establishment and maintenance of the bladder 22 in the expanded or inflated orientation 22'. Accordingly, an embodiment of the present invention also includes a flow restrictor 30 disposed along and in communication with the fluid flow path or conduit 28. Therefore, maintenance of the bladder 22 in the expanded and/or inflated orientation involves the prevention of fluid leaking from the interior of the bladder 22, when in the expanded/inflated orientation 22'. Accordingly, the flow restrictor 30 is disposed and structured to restrict fluid flow in at least one direction, schematically represented as 28' in FIGS. 7A and 7B, from the interior of the bladder 22 to an exterior thereof and/or to an exterior of the sleeve or sheath 12.

Figure 5:
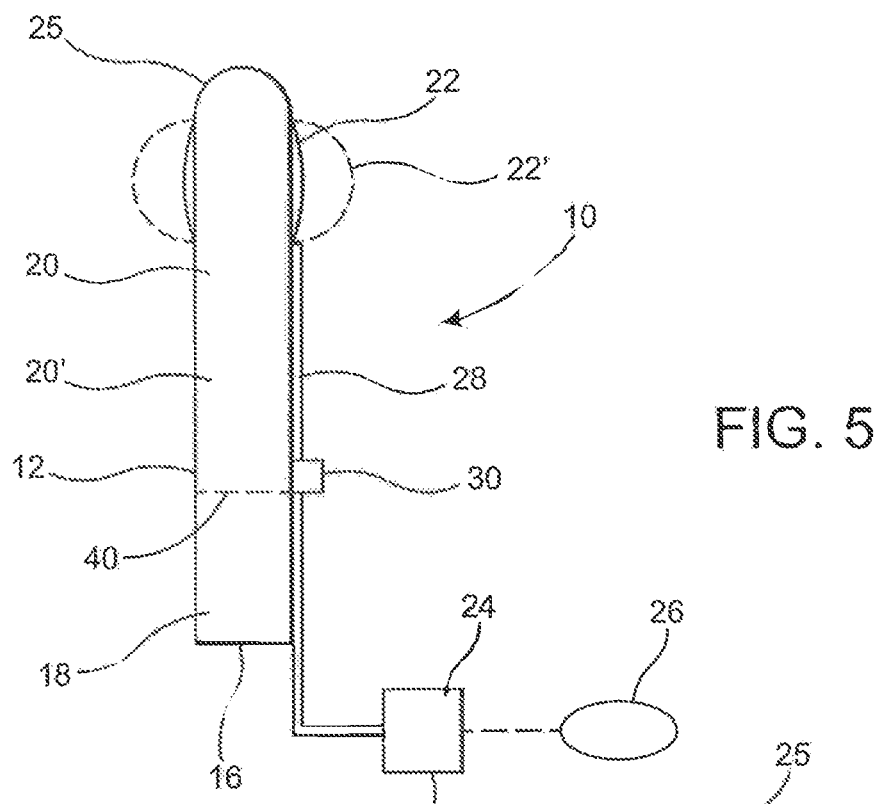
FIG. 5 is a schematic representation of yet another preferred embodiment of the dilator device.
Figure 6:
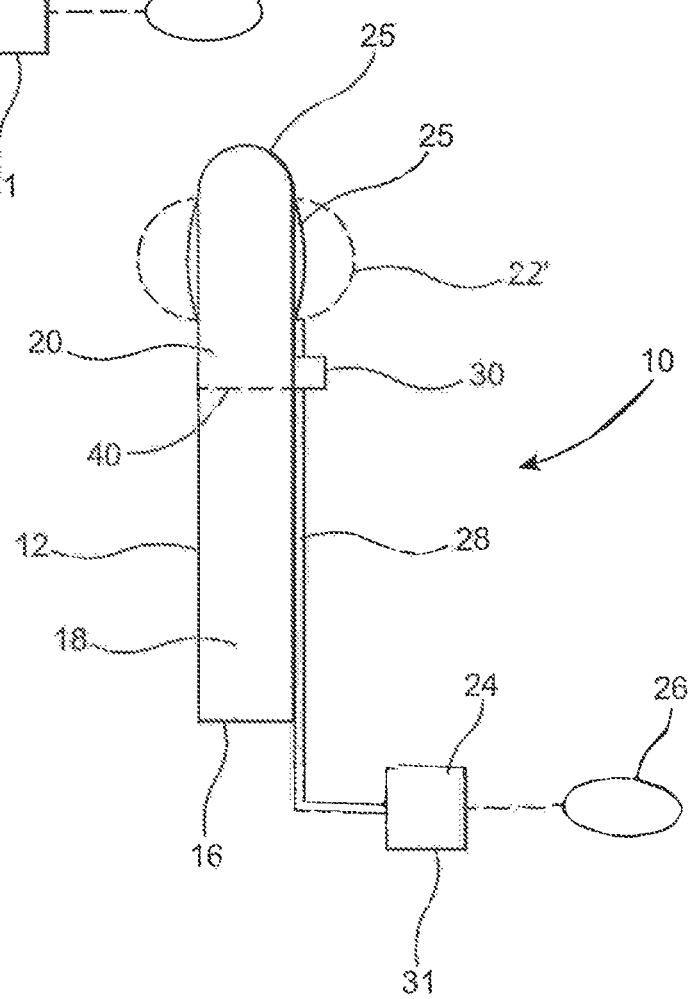
FIG. 6 is a schematic representation of yet another preferred embodiment of the dilator device.
Figure 7A:
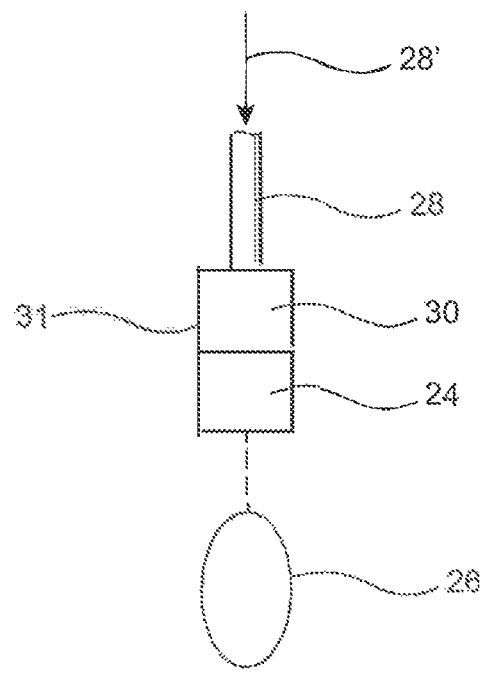
FIG. 7A is a schematic representation in partial cutaway of a fluid input device which may be operatively associated with the embodiments of FIGS. 1-6.
Figure 7B:
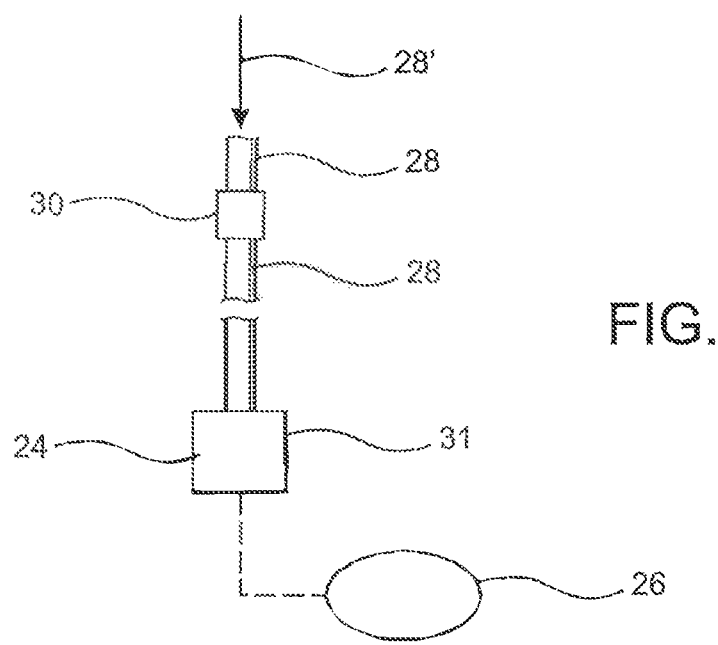
FIG. 7B is a schematic representation in partial cutaway of yet another embodiment of a fluid input device which may be operatively associated with the embodiments of FIGS. 1-6.

With further reference to FIGS. 7A and 7B, different embodiments of the fluid input 24 includes it being connected to or otherwise operatively associated with the flow restrictor 30, such as by being encased within a common housing or the like 31. In contrast, and for the reasons set forth in greater detail hereinafter, the flow restrictor 30 may be located in spaced relation to the fluid input 24 and along the fluid flow path or conduit 28, as schematically represented in FIGS. 5, 6 and 7B. As such, the flow restrictor 30 may be located at any point along and in operative association with the flow path at least partially defined by the fluid conduit 28, so as to restrict fluid flow from the interior of the bladder 22, once the bladder 22 is in the expanded and/or inflated orientation 22'. Further, as also represented in FIGS. 7A and 7B the flow restrictor 30 may be in the form of a check valve which is normally operable to restrict fluid flow along the fluid flow path in at least a first direction 28' between the bladder 22 and the fluid input 24.

During normal usage it will of course be necessary to remove the sleeve 12 of the dilator device 10 from its operative position relative to an inflation site, such as associated with the paranasal sinuses 100. In doing so, the bladder 22 will be selectively deflated or reduced from its expanded orientation 22' into its normal, non-inflated, non-expanded and/or retracted orientation 22". Accordingly, the flow restrictor 30, which may include a one-way check valve or similarly operative structure, is structurally operative to selectively allow fluid flow in the direction 28' schematically represented in FIGS. 7A and 7B, from the interior of the bladder 22 through an appropriate portion or length of the fluid flow conduit 28 to an exterior of the sleeve or sheath 12. As also described in greater detail hereinafter the exiting of the fluid in the initially restricted first direction 28' may be directed through the fluid input 24 or exit from another portion of the fluid conduit 28 to an exterior of the sleeve 12, when it is desired to deflate or retract the bladder 22.

With primary reference to FIGS. 5 and 6, one or more additional preferred embodiments of the dilator device 10 includes the proximal portion 18 being separable and disconnected from the distal portion 20. Such situations may commonly arise when the bladder 22 is intended to be maintained in an operative position relative to a dilation site for an extended period of time, while in the inflated or expanded orientation 22'. Accordingly one feature of the dilator device 10 includes its ability to be used with any of a plurality of positioning instruments 200 which may be easily, quickly, and simply removed from the interior 14 of the sleeve 12 once it is disposed at the dilation site and expanded or inflated. Further, when intended to be retained for an extended time, it may be desirable to reduce the overall length of the sleeve 12. Such reduction in the length may be accomplished by separating the distal portion 18 from the distal portion 20 along a frangible portion 40. As such, the frangible portion 40 preferably includes a weakened segment or segmented seem which facilitates the disconnection and/or separation of the proximal portion 18 from the distal portion 20. Further, such separation may easily occur when a sufficient pulling or other appropriately directed force is applied to the proximal portion 18. Further, the weakened segmented structuring of the frangible portion or seam 40 is structured to break away or cause the intended separation by an exerted force, which is insufficient to dislodge the bladder 22, when in its expanded or inflated orientation 22', from the dilation site. In addition, one embodiment of the present invention contemplates that the frangible portion 40 preferably extends circumferentially around the entire sleeve 12 or at least a majority thereof. Also, the frangible portion may be structured to break away or facilitate separation between the proximal portion 18 and distal portions 20 using the appropriate instrumentation instead of the aforementioned pulling or appropriately directed force.

As also noted from a review of FIGS. 5 and 6, the frangible portion 40 may be located at various positions along the length of the sleeve 12, dependent upon the particular dilation procedure intended. Accordingly, when the frangible portion 20 is located closer to the access opening 16, the distal portion 20 may include a tail portion 20'. The tail portion 20' may be of sufficient length to be accessible from within or from without the paranasal sinuses 100 or other location of the dilation site. This accessibility due to the somewhat elongated dimension of the tail portion 20' facilitates the subsequent removal of the distal portion 20 from the intended dilation site, using instrumentation or merely exerting a sufficient pulling force thereon, once the bladder 22 is deflated into its retracted orientation 22".

It should be apparent that when the proximal portion 18 is separated and/or disconnected from the distal portion 20 it still may be important to maintain the bladder 22 in the expanded or inflated orientation 22'. Accordingly the aforementioned flow restrictor 30 may be mounted on or connected to the distal portion 20 in flow regulating relation to a corresponding portion of the flow path or conduit 28, regardless of the location of the frangible portion 40 as demonstrated FIGS. 5 and 6. Moreover, the flow restrictor 30, regardless of its location, should still be accessible either by hand or through appropriate instrumentation so as to allow fluid flow to pass in the direction 28' thereby allowing the deflation of the bladder 22 from its expanded or inflated orientation 22' into its retracted orientation 22". Therefore, while the flow restrictor 30 is normally structured to restrict fluid flow in the direction 28', it is also structured to selectively allow fluid flow in the direction 28' in order to facilitate the deflation of the bladder 22 into its normal retracted or collapsed orientation 22".

As set forth above, yet another preferred embodiment of the dilator device 10 is represented in FIGS. 8A-10. More specifically, this preferred embodiment of the dilator device 10 includes an elongated sleeve represented as 12'. The elongated, flexible material sleeve 12' includes the aforementioned access opening 16 at the outer extremity of the proximal portion 18 and also an open end 27 at the outer extremity of the distal portion 20. As also represented, the access opening 16 and the open end 27 are substantially oppositely disposed by virtue of their corresponding position relative to the opposite, outer extremities of the proximal portion 18 and the distal portion 20. The open end 27 facilitates a corresponding outer or end 210 of the selected positioning instrument 200 being disposed in direct, open, viewing relation and/or fluid communication to the area intended to be dilated such as, but not limited to the paranasal sinuses 100. For purposes of clarity, the term "direct viewing relation", "direct fluid communication" and/ or "direct access" is meant to include the end 210 and any device associated there with being openly exposed to the area being dilated, rather than being positioned adjacent thereto but separated therefrom by a closed end 25 of the sleeve 12, as generally represented in FIGS. 2-6.

As further represented in FIGS. 9 and 10 the positioning instrument 200 may include an appropriate connector 12 which facilitates the removable attachment of the positioning instrument 200 to a negative pressure source. As a result the paranasal sinuses 100 or other area to be dilated can be suctioned continuously or selectively as the dilator device 10 moves into and is disposed at an operative orientation relative to the site being dilated.

In addition, the positioning instrument 200 may include a viewing device, and/or endoscope/camera located on or adjacent to the distal end 210 or other appropriate location on the selected positioning instrument 200. As such, the viewing device, camera, etc. and the end 210 will be disposed, when assembled with the dilator device 10 as represented in FIG. 10, proximate, at, and/or in corresponding relation to the open end 27 to facilitate direct access and communication with the area to be dilated. Such direct access will allow a direct viewing or other type communicating relation of the end 210 and/or device associated therewith, with the area to be dilated through the open end 27. Moreover, such direct access or direct communication will enable real-time viewing, recording, and/or other type of visual observation of the area being dilated such as, but not limited to, the paranasal sinuses 100.

By way of example only, the represented positioning instrument 200 may be formed of an appropriate material and be cooperatively dimensioned with the sleeve 12' to be disposed telescopically within the interior thereof as schematically represented by directional arrow 29 in FIG. 9. Accordingly, when in the assembled form as represented in FIG. 10, the end 210 or viewing device, camera, etc. will be disposed adjacent and/or in a corresponding position relative to the open end 27 thereby allowing the aforementioned direct access and/or communication. As indicated the direct communication will facilitate the performance of suctioning and/or direct viewing of the area to be dilated during the positioning and final intended location of the bladder 22 in the operative orientation relative to a specific site to be dilated.

As represented in FIGS. 11 and 12, additional features of an embodiment of the present invention include providing a sleeve 12 that comprises a tip 60 having a predetermined configuration that facilitates positioning the dilator device 10, and more specifically the elongated sleeve 12, within the paranasal sinuses 100. Accordingly, the predetermined configuration may be defined as the tip 60 having a substantially tapered configuration, indicated as 62 in FIGS. 11, 12, 15, and 16. The tapered configuration 62 should be such that the sleeve 12, and more specifically the tip 60, similarly comprises an open end 27. The open end 27, also referred to as a distal access opening, is in communicating relation with the hollow interior 14. The tapered configuration 62 of the tip 60 also facilitates entry of the sleeve 12 and bladder 22 into relatively small openings, such as within the paranasal sinuses 100. The tapered configuration 62 reduces the effective diameter of the tip 60 so that the open end 27 may reach smaller openings than otherwise without a tapered configuration 62. Furthermore, the tapered configuration 62 also serves to more effectively direct the tip 60, and consequently the sleeve 22, towards a desired location within the paranasal sinuses 100. The tapered configuration 62 facilitates advancement of the elongated sleeve 12 within a lumen of the body. An inner surface of the tip 60 can form a distal end of the hollow interior 14. The inner surface of the tip 60 can have a conical taper narrowing to the open end 27 (distal access opening). The inner surface of the tip can comprise surface elements that engage a positioning element 200.

Figure 3:
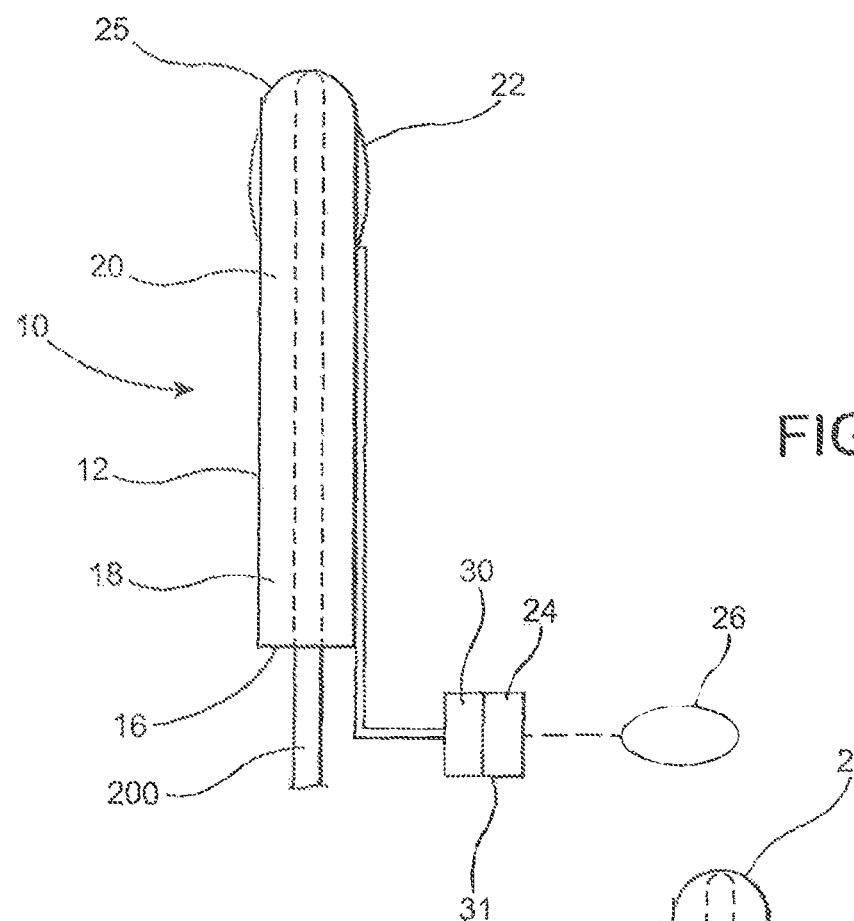
FIG. 3 is a schematic representation of the embodiment of FIG. 2 in an expanded orientation.
Figure 4:
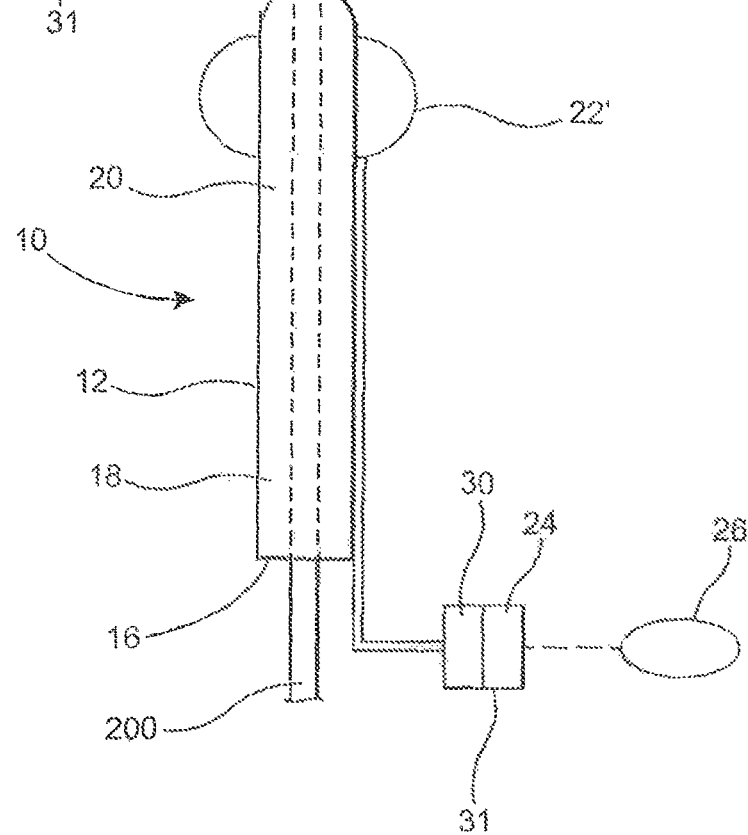
FIG. 4 is a schematic representation of yet another embodiment of a dilator device operatively similar to but distinguishable from the embodiments of FIGS. 1-3.

Similar to the embodiments of FIGS. 3 and 4, as described above, and as also represented at least in FIG. 16, a positioning instrument 200 may be inserted through the access opening 16 and disposed substantially along the length of the sleeve 12 in the hollow interior 14. As can be appreciated in FIG. 16, the size of the open end 27 can be smaller relative to the size of the positioning instrument 200 to prevent further movement of the positioning instrument 200 beyond the open end 27. As shown in FIG. 16, the positioning instrument 200 may be disposed against or may be in direct contact with at least a portion of an inside of the tip 60, and more specifically an inside of the tip 60 around its tapered configuration 62. Consequently, when the positioning instrument 200 is disposed against an inside of the tip 60 around the tapered configuration 62, further movement of the positioning instrument 200 results in a substantially corresponding movement of the elongated sleeve 12, and consequently the dilator device 10.

In one embodiment, the dilator device 10 may be used not only to dilate various parts of the body, such as the paranasal sinuses 100, but may also be used to facilitate suction of an intended location. As previously mentioned, embodiments of the dilator device 10 may be used in conjunction with a suction component, or other instrument that can exert negative pressure to an intended location. When the dilator device 10 is used in conjunction with a suction component, there may be instances where it may be desirable to adjust the position of the dilator device 10 while maintaining the suction component in a fixed position. Similarly, it may be necessary to adjust the position of the suction component while maintaining the bladder 22 in a fixed position. For example, once the bladder 22 is positioned over a desired area, it may be desirable to move the suction component beyond the open end 27 in order to treat a deeper location within paranasal sinuses 100. Also, as an example, once the suction component is positioned at a desired location, it may be necessary to move the bladder 22 to expand a different area within the paranasal sinuses 100. Accordingly, both the suction component and the sleeve 12 can be dimensioned and configured to establish a movable and sliding relation between them. In order to achieve this, the size of the hollow interior 14 can be sufficient so as to receive therein the suction component. Additionally, the size of the open end 27 can be such that the suction component may reciprocally move within the hollow interior 14, and so that it may also pass through the open end 27. In some aspects, the open end 27 and a conical taper of the inner surface of the tip 60 can sealably engage a suctioning component positioned within the hollow interior 14.

The suction component may be disposed in an "operative condition" that may be defined as the suction component being operative to exert negative pressure at or around the intended body part. The "operative condition" may occur concurrent to or independently of movement of the suction component and sleeve 12 relative to each other. Furthermore, the predetermined configuration of the tip 62 may also comprise the open end 27 and the hollow interior 14 being disposed in fluid communication with the suction component. If so desired, a fluid communication as described above, enables the sleeve 12 to exert negative pressure at or around an intended body part. Thus, the sleeve 12 may effectively act as an extension to the suction component. Moreover, and although not necessarily required, the positioning instrument 200 may comprise a suction component. That is, the suction instrument 200 may be structured to operate with a suction component. Alternatively, the suction instrument 200 may comprise an integrally formed suction component. Thus, a positioning instrument 200 comprising a suction component may be disposed in fluid communication with the hollow interior 14 to enable the sleeve 12 to exert negative pressure at or around an intended body part.

Additional features of some embodiments of the present invention comprise navigation capabilities. The elongated sleeve 12, and more specifically the tip 60, may be configured to enable a navigation interface. A navigation interface as used herein may be at least partially defined as an external device that can be located on the exterior of the body and configured to substantially duplicate the movement of the dilator device 10, such as when the dilator device 10 is located within the paranasal sinuses area 100. More specifically, the external device may be located on the exterior of the body, such as on the skin of the face of a person, but in substantial alignment with paranasal sinuses 100 and dilator device 10 located therein. The external device may form an at least partially operable magnetic interface with the tip 60. In order to achieve a magnetic interface, the external device can comprise a magnet while the tip 60 can comprise a material capable of being attracted to a magnet. Alternatively, the tip 60 may comprise a magnet, while the external device may comprise a material capable of being attracted to a magnet. Materials suitable to form a magnetic interface include, but are not limited to, iron, nickel, and/or cobalt. Thus, when the dilator device 10 moves or penetrates within the paranasal sinuses 100, the magnetic interface will permit the external device to substantially duplicate the movement of the dilator device 10. Therefore, the external device may move on or relative to the face of the person according to the movement of the dilator device 10, and more specifically the tip 60, within the paranasal sinus area 100. Such a substantially duplicative movement of the external device may thus be used to determine at least an approximate position and preferably a reliably accurate position of the tip 60 within the paranasal sinuses 100.

The navigation interface may also be at least partially defined as a component of the tip 60 that is observable on a variety of imaging capabilities such as, but not limited to, x-rays, MRIs, and CT or CAT scans. For example, this observable component may be a material such as, but not limited to, barium sulfate which may act as a contrast agent that is observable on an x-ray. Thus, the tip 60 may be configured to include such an observable component so that the movement of the dilator device 10 may be tracked as it penetrates the paranasal sinuses 100. In some aspects, the tip 60 can include a radiopaque material. Further, as an example, one or more x-rays of the intended area may be taken to track and determine the specific location of the dilator device 10 when located within the paranasal sinuses 100.

As represented in FIG. 15, additional features of one embodiment of the dilator device 10 comprises an irrigation structure configured to provide irrigation to an intended body part. Accordingly, the sleeve 12, and more specifically the tip 60, may comprise an irrigation portion, indicated as 64. The tip 60, and more specifically the irrigation portion 64, may comprise one or more irrigation openings, such as at 66, which may be used to irrigate the intended body part. The interior of the tip 60 and the irrigation opening(s) 66 should be disposed in fluid communication with at least a portion the hollow interior 14 so that a fluid may pass through the hollow interior 14 and exit through the irrigation opening(s) 66 to irrigate the intended body part. The irrigation fluid may come from a second or different source than the fluid source 26 that inflates the balloon. Alternatively, the irrigation fluid may come from the same fluid source 26.

The irrigation mechanism of the dilator device 10 can function independently or in conjunction with a suction component being disposed in the "operative condition." Accordingly, suction and irrigation do not need to occur concurrently, but may occur concurrently if so desired. Moreover, suction and/or irrigation may occur with or without the bladder 22 being in the expanded orientation 22'. Therefore, the dilator device 10 is sufficiently versatile such that positioning of the dilator device 10 within the paranasal sinuses 100, inflation of the bladder 22, suction, a navigation interface, and irrigation of the paranasal sinuses 100, are all functions that may occur independently or concurrently, depending on the need.

FIGS. 17A through 17C schematically illustrate a balloon 22, also referred to as a bladder, that can be used in conjunction with the dilator device 10. FIG. 17A shows a balloon 22 in un-loaded (i.e. resting) and un-dilated configuration. In some aspects, the balloon 22 is elongate. The balloon 22 has an inner diameter 302 that is not under strain. In some aspects, the inner diameter 302 of the balloon 22 is a sleeve 12 or is coupled, which can include bonded, to a sleeve 12 such that the balloon 22 is circumferentially disposed about the sleeve 12. The balloon 22 (which can include a sleeve 12) can be designed to conform to, and take the shape of, a variety of positioning instruments 200 having different shapes and/or sizes (including positioning instruments 200 that are widely available and/or specifically designed for use with the dilator device 10). A sleeve 12 can lack the capability to place a balloon 22 without the assistance of a positioning instrument 200, which can be due to a lack of rigidity of the sleeve 12. The inner diameter 302 (which can include or be coupled to a sleeve 12) surrounds a hollow interior 14. The hollow interior 14 can have an interior wall, which can be the sleeve 12 and/or inner diameter 302 or a separate interior wall that can couple to the sleeve 12 and/or inner diameter 302 of the balloon 22. The interior wall (or a portion thereof) of the hollow interior 14 can be coated with a polymer, which can include a lubricous polymer. The balloon 22 has an outer diameter 304 that is not expanded because the balloon is un-dilated—not filled with a fluid, memory spline, and/or memory foam. As illustrated, the balloon 22 is an annular structure surrounding the hollow interior 14.

FIG. 17B shows the positioning instrument 200 positioned within the hollow interior 14 such that the balloon 22 is loaded onto a positioning instrument 200 in an un-dilated configuration. The balloon 22 and/or sleeve 12 can conform onto the positioning instrument 200 while, in some aspects, only contributing a small increase in overall size or outer diameter to the positioning instrument 200. The inner diameter 302 is positioned around the positioning instrument 200. Positioning the inner diameter 302 around the positioning instrument 200 can cause the inner diameter 302 to be coupled, fixed, connected, and/or mated to the positioning device 200 such that the balloon 22 moves with the positioning instrument 200. In some aspects, the inner diameter 302 can stretch and/or deflect to fit around the positioning instrument 200 which can result in the inner diameter 302 exerting a radially compressive force inward on the positioning instrument 200. In some aspects, the outer diameter 302 can be pleated and/or folded when not dilated, which can advantageously make it easier to position the balloon 22 in an area of the human body. In some aspects, the outer diameter 302 is free flowing which can advantageously make the balloon 22 cheaper and less complicated to manufacture. In some aspects, the outer diameter 304 is tight against the positioning instrument 200 until dilation, which can advantageously make it easier to position the balloon 22 in an area of the human body.

FIG. 17C shows the balloon 22 dilated with the balloon 22 filled with fluid, which can be described as filling an inner bladder of the balloon 22. The outer dimeter 302 is enlarged extending radially outward from the positioning instrument 200. In some aspects, the inner diameter 302 (which can include or be coupled to a sleeve 12), as a result of dilation, extends or deflects inward toward the hollow interior 14 and/or positioning instrument 200, causing the inner diameter 302 to decrease in size and/or exert a radially inward compressive force on the positioning instrument 200. In some aspects, an inner wall that defines the inner diameter 302 is more compliant to dilation than an outer wall that defines the outer diameter 304. In some aspects, the inward deflection of the inner diameter 302 (which can include a sleeve 12) causes a reduction in diameter size of the hollow interior 14 by or at least 1-5%, 5%-10%, 10%-15%, 15% to 20%, 20%-25%, or 25%-30%. A preferred range can be at least 10%. In some aspects, the inward deflection of the inner diameter 302 (which can include a sleeve 12) can be selectively controlled by an amount of fluid introduced into the balloon 22. This can result in the inner diameter 302 fixedly coupling to the positioning instrument 200, causing the balloon 22 to move with the positioning instrument 200. In some aspects, the balloon 22 and/or sleeve 12 are positioned onto the positioning instrument with a tool.

Figure 2:
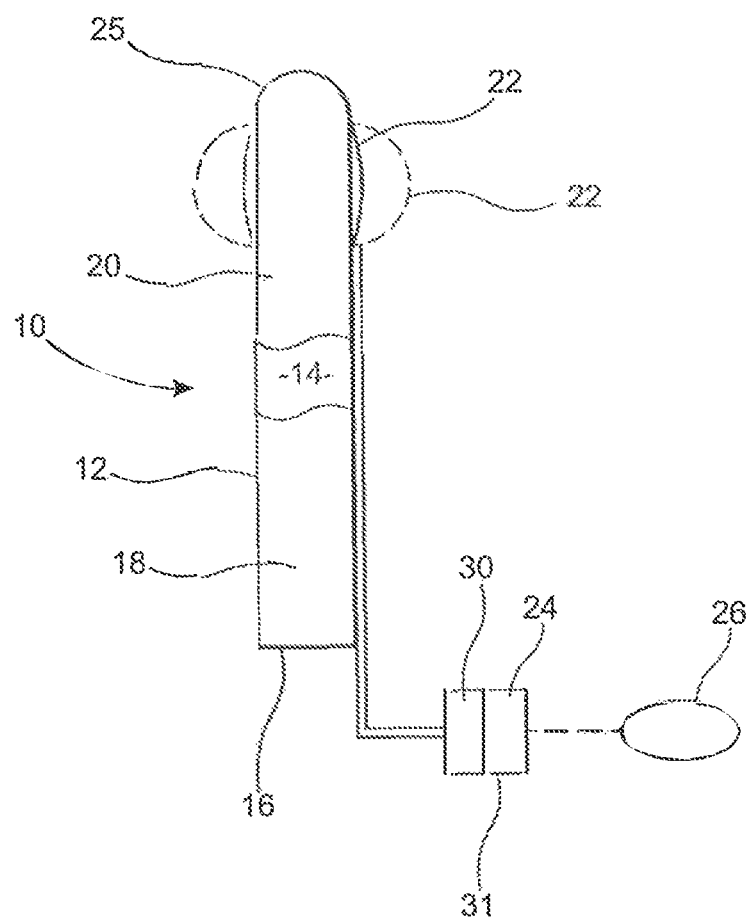
FIG. 2 is a schematic representation of an embodiment of a dilator device in a non-expanded orientation, mounted on any one of a possible plurality of positioning instruments.
Figure 17E:
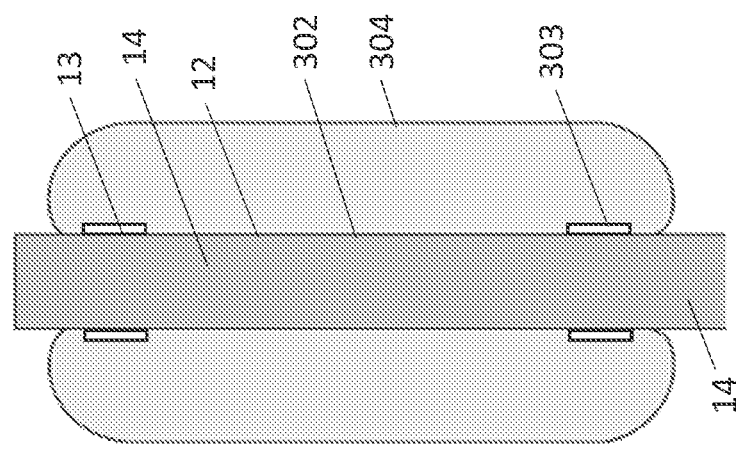
FIG. 17E illustrates a longitudinal section view of another balloon.
Figure 17D:
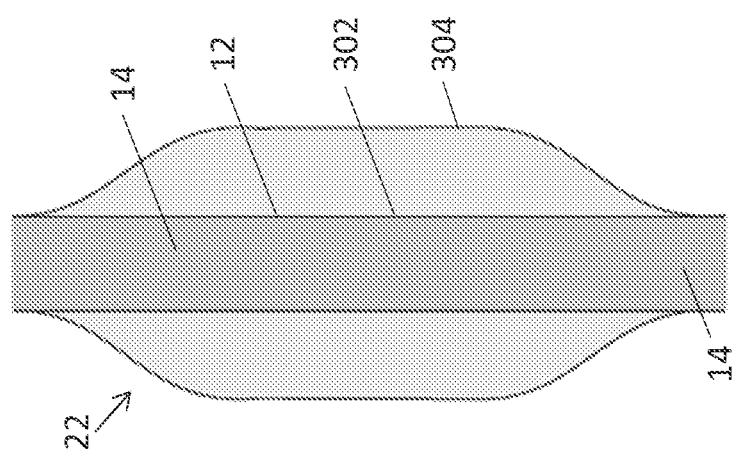
FIG. 17D illustrates a longitudinal section view of another balloon.

FIGS. 17D through F-2 schematically illustrate a variety of balloon 22 configurations. FIG. 17D illustrates a balloon 22 with an inner diameter 302 and outer diameter 304. The balloon 22 can be coupled to a sleeve 12, or in some aspects, the sleeve 12 can be the inner diameter 302 of the balloon 22. The sleeve 12 and inner diameter 302 surround a hollow interior 14 that receives positioning instruments 200. The balloon 22 has two tapered ends that have outer diameters that decrease in size in the direction of the longitudinal axis of the balloon 22. FIG. 17E illustrates a balloon 22 that is the same as shown in FIG. 17D except that the balloon 22 has a more uniform size, which can include more consistent outer diameter 304. The balloon 22 shown in FIG. 17E has two rounded ends, which can help to facilitate having a more consistent outer diameter 304. FIG. 17F-1 illustrates a balloon 22 that can be seamless. The balloon 22 has an inner diameter 302 and outer diameter 304 that are formed by rolling or folding a tubular structure outwards and back upon itself and bonding the rolled or folded tubular structure to itself at a bonding location 305, creating the balloon 22 with a closed cavity. FIG. 17F-2 illustrates a similar balloon 22 shown in FIG. 17F-1 except that the tubular structure that forms the balloon 22 also defines a sleeve 12. The tubular structure is the sleeve 12 and is rolled or folded outwards and back upon itself and bonded at a bonding location 305, creating the balloon 22 with a closed cavity. This advantageously can enable a balloon 22 to be formed and coupled to the sleeve 12 with bonding at a single bonding location 305. Further, this can advantageously provide a more secure coupling between the balloon 12 and the sleeve 12 given that each is part of the same monolithic structure. FIGS. 17G-1 through 17G-3 illustrate manufacturing steps that can be used to produce the balloon 22 shown in FIGS. 17F-1 and 17F-2. FIG. 17G-1 illustrates a tubular structure 303. As shown in 17G-2, the tubular structure 303 can be rolled outward and back upon itself, starting to form the outer diameter 304 and inner diameter 302. FIG. 17G-3 illustrates the tubular structure 303 bonded to itself at bonding location 305, forming the balloon 22 with the outer diameter 304 and inner diameter 302.

Figures 1, 18A:
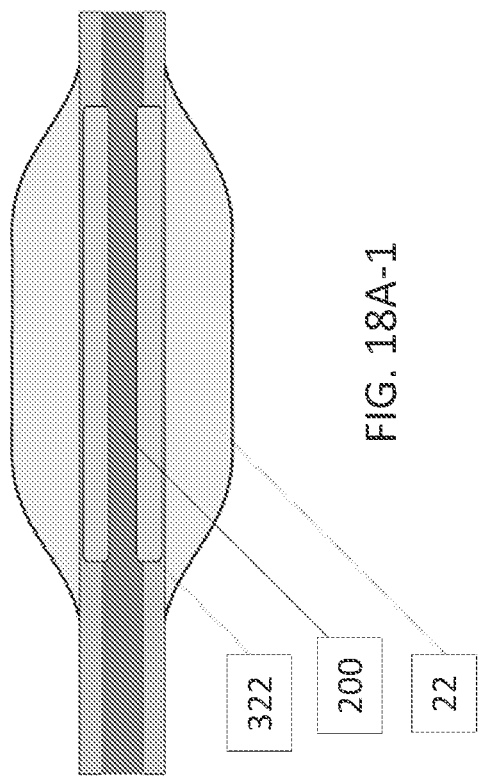
Figures 1, 18B:
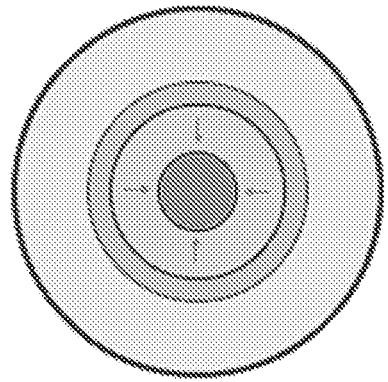
Figure 18A:
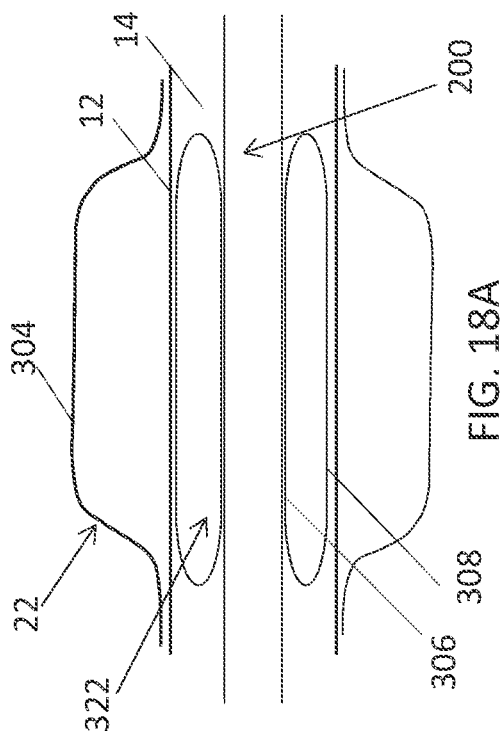
Figure 18B:
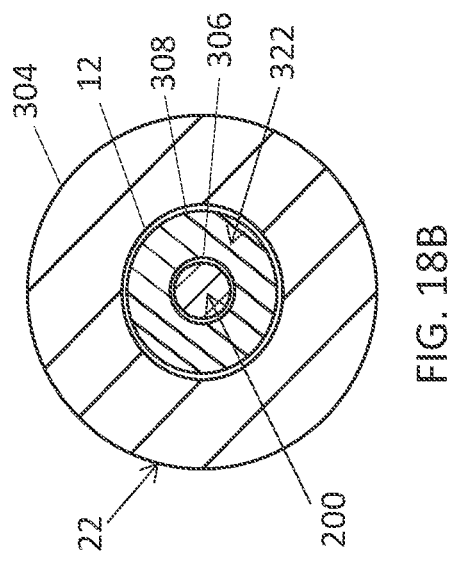

FIGS. 18A through 18B-1 schematically illustrate a balloon 22, sleeve 12, and inner balloon 322 that can be used in conjunction with the dilator device 10. The balloon 22 is coupled to a sleeve 12. The balloon 22 is circumferentially disposed about the sleeve 12. The sleeve 12 is the inner diameter of the balloon 22. In some aspects, the inner diameter of the balloon 22 is coupled to the sleeve 12. The sleeve 12 can surround a hollow interior 14. The sleeve 12 can be coupled to an outer diameter 308 of the inner balloon 22. In some aspects, the sleeve 12 is the outer diameter 308 of the inner balloon 22. The inner balloon 22 is positioned within the hollow interior 22. The balloon 22 and the inner balloon 322 are concentrically positioned relative to each other. The balloon 22 and the inner balloon are coaxial. When the balloon 22 is dilated, the outer diameter 304 of the balloon 22 is expanded radially outward and the sleeve 12 can extend or deflect inward and into the hollow interior 14 and/or against the inner balloon 322. This can result in the sleeve 12 applying a inward compressive force on the inner balloon 322. When the inner balloon 322 is dilated, the outer diameter 308 expands radially outward to apply an outward force on the sleeve 12 and a inner diameter 306 expands radially inward, which can be toward and/or against the positioning instrument 200 and/or into the hollow interior 14. The compressive force from the inner diameter 306 on the positioning instrument 200 can fixedly couple the inner balloon 322 to the positioning instrument 200, which can result in the sleeve 12, balloon 22, and/or inner balloon 22 being fixedly coupled to the positioning instrument 200. The balloon 22, sleeve 12, and/or inner balloon 322 can conform to positioning instruments 200 of different sizes and shapes.

Figure 19A:
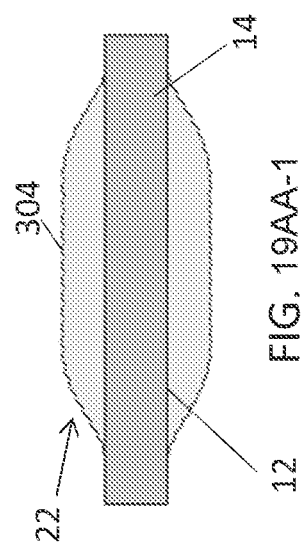
Figure 19A:
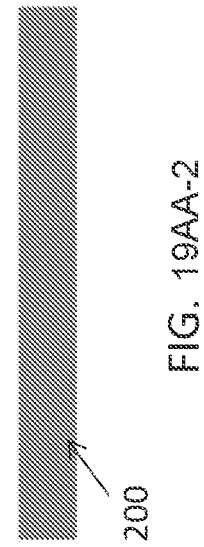
Figures 1, 19A:
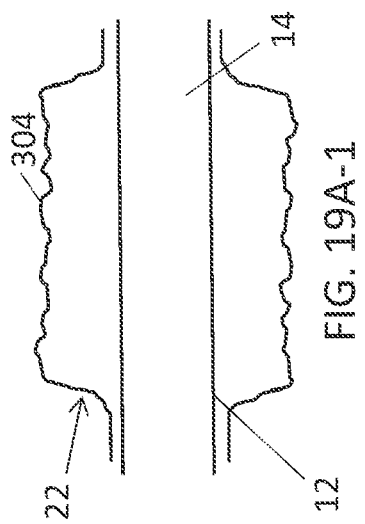
Figures 2, 19A:
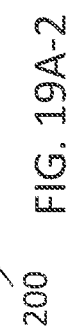
Figures 1, 19C:
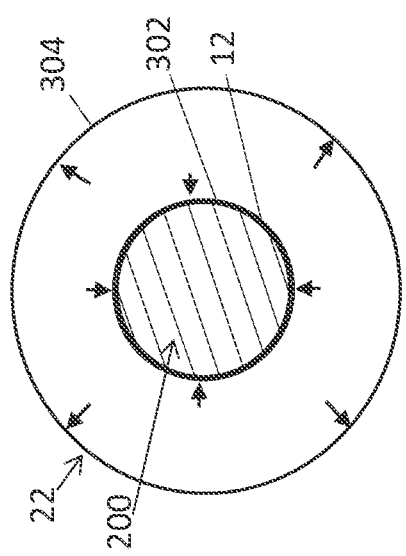
Figure 19C:
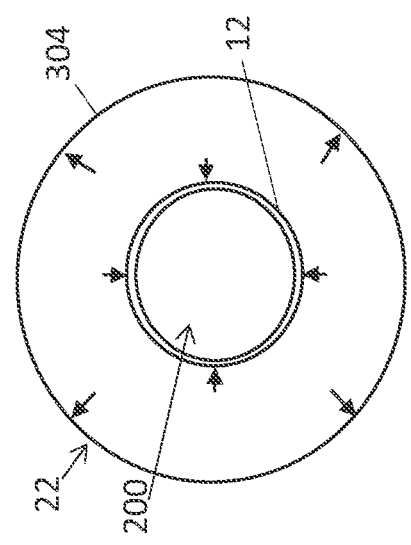
Figures 2, 19C:
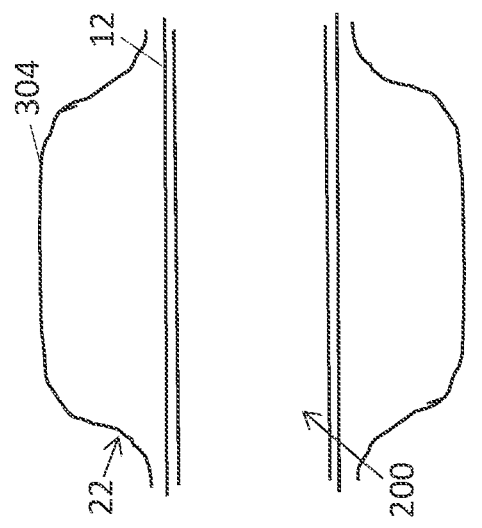

FIGS. 19A-1 through 19C-2 schematically illustrate a balloon 22 and sleeve 12 that can be used in conjunction with the dilator device 10. FIGS. 19A-1 and 19AA-1 show a balloon 22 in an un-dilated configuration. The inner diameter of the balloon 22 is the sleeve 12. In some aspects, an inner diameter of the balloon 22 is coupled to the sleeve 12. The balloon 22 is circumferentially disposed about the sleeve 12. The sleeve 12 can be made of an elastic material that can stretch and/or deflect upon application of a force or positioning around an positioning instrument 200 with a larger outer diameter, such as depicted in FIGS. 19A-2 and 19AA-2. The sleeve 12 surrounds a hollow interior 14. FIGS. 19B-1, 19BB-1, and 19B-2 illustrate the positioning instrument 200 positioned within the hollow interior 14. The balloon 22 and sleeve 12 are loaded onto the positioning instrument 200. The sleeve 12 is stretched and/or defected to surround the positioning instrument 200 such that the sleeve 12 and balloon 22 are fixedly coupled to the positioning instrument 200 causing the sleeve 12 and balloon 22 to move with the positioning instrument 200. The sleeve 12 loaded on the positioning instrument 200 can exert an inward compressive force on the positioning instrument 200. FIGS. 19C-1, 19CC-1, and 19C-2 illustrate the balloon 22 in dilated configuration. When dilated, the balloon 22 can extend the outer diameter 304 radially outward. When dilated, the sleeve 12 can be extend or deflect radially inward into the hollow interior 14 and/or toward and/or against the positioning instrument 200, which can further secure the sleeve 12 and/or balloon 22 to the positioning instrument 200. The balloon 22 and/or sleeve 12 can conform to positioning instruments 200 of different sizes and shapes. In some aspects, as shown in FIG. 19-D, the balloon 22 and/or sleeve 12 can be stored in a rolled state, resembling a torus, by rolling up the balloon 22 and/or sleeve 12 outward and back upon itself. Any of the balloons 22 and/or sleeves 12 disclosed herein can be stored in a rolled state shown in FIG. 19-D, even with elastic rings, coils, braids, and/or other similar loading devices.

FIGS. 20A-1 through 20C-2 schematically illustrate a balloon 22 and sleeve 12 with a plurality of rings 310 that can be used in conjunction with the dilator device 10. FIG. 20A-1 shows a balloon 22 in an un-dilated configuration. The inner diameter of the balloon 22 is the sleeve 12. In some aspects, the inner diameter of the balloon 22 is coupled to the sleeve 12. The sleeve 12 surrounds a hollow interior 14. The balloon 22 can circumferentially surround the sleeve 12. A plurality of rings 310 surround the sleeve 12 and are positioned within the balloon 22. In some aspects, the plurality of rings 310 are embedded in the sleeve 12. The plurality of rings 310 can be made of a material that can stretch and/or deflect upon application of a force or positioning around an positioning instrument 200, such as depicted in FIG. 20A-2. The plurality of rings 310 can be made of an elastic material. FIGS. 20B-1 and 20B-2 illustrate the positioning instrument 200 positioned within the hollow interior 14. The sleeve 12 and plurality of rings 310 are loaded onto the positioning instrument 200. The plurality of rings 310 apply a compressive force on the positioning instrument 200. The plurality of rings 310 can fixedly couple the sleeve 12 and/or balloon 22 to the positioning instrument 200 such that the sleeve 12 and/or balloon 22 move with the positioning instrument 200. FIGS. 20C-1 and 20C-2 illustrate the balloon 22 in a dilated configuration. The outer diameter 304 is expanded radially outward. In some aspects, the sleeve 12 can extend or deflect radially inward and into the hollow interior 14 and/or toward and/or against the positioning instrument 200. This can secure the sleeve 12 and/or the balloon to the positioning instrument 200 such that the sleeve 12 and/or balloon move with the positioning instrument 200. The balloon 22, sleeve 12, and/or plurality of rings 310 can conform to positioning instruments 200 of different sizes and shapes.

Figures 2, 21A:
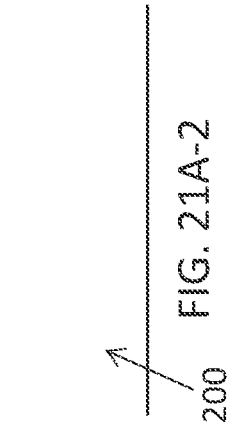
Figures 2, 21B:
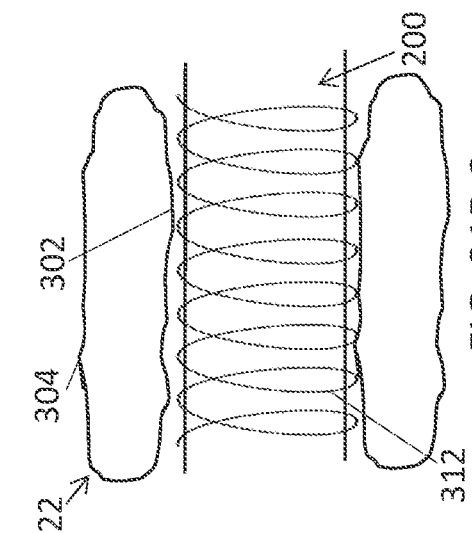
Figures 1, 21A:
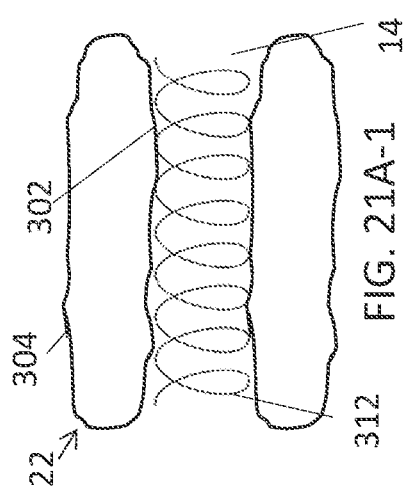
Figures 1, 21B:
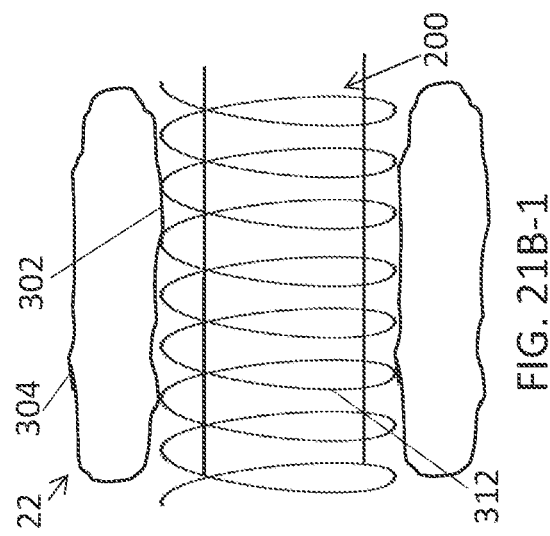
Figure 21C:
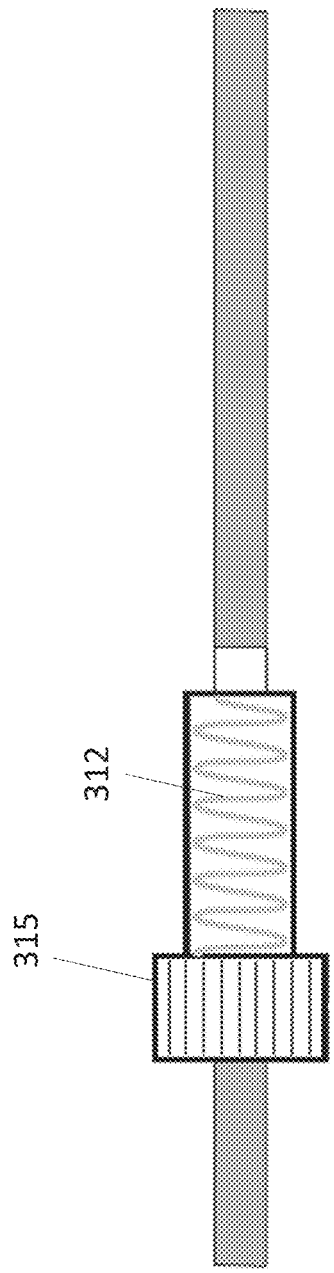
FIG. 21C illustrates a twist lock mechanism that can be used with the balloon of FIG. 21A-1.

FIGS. 21A-1 through 21B-2 schematically illustrate a balloon 22 and coil 312 that can be used in conjunction with the dilator device 10. FIG. 21A-1 illustrates a balloon 22 in an un-dilated configuration. The inner diameter 302 of the balloon 22 is coupled to a coil 312. The coil 312 can be a mechanical coil. The coil 312 can be made of a variety of materials, which can include polymers and/or metals. In some aspects, the coil 312 is embedded in the inner diameter 302 of the balloon 22. In some aspects, the coil 312 is coupled to and/or embedded in a sleeve 12 which is in turn coupled to the inner diameter 302 of the balloon 22 or is the inner diameter 302 of the balloon 22. The inner diameter 302 (which can include a sleeve 12) and coil 312 can surround a hollow interior 14. The balloon 22 can circumferentially surround a sleeve 12, the coil 312, and/or the hollow interior 14. The coil 312 can expand to be positioned around the positioning instrument 200 of FIG. 21A-2, as illustrated in FIG. 21B-1. The coil 312 can be twisted to expand radially outward such that the diameter of the coil 312 is enlarged and can be positioned around the positioning instrument 200. The coil 312 can be released from the twisted configuration, decreasing the diameter of the coil 312 to load the coil 312 onto and around the positioning instrument 200, as illustrated in FIG. 21B-2. Loading the coil 312 onto the positioning instrument 200 can result in the coil 312 applying a radially compressive force to the positioning instrument 200 such that the coil 312 and the balloon 22 are fixedly coupled to the positioning instrument 200. Loading the coil 312 onto the positioning instrument 200 can cause the coil 312 and the balloon 22 to be move with and surround the positioning instrument 200. The balloon 22 can be dilated, expanding the outer diameter 304 radially outward and, in some aspects, extending or deflecting the inner diameter 302 (which can include a sleeve 12) inward such that the inner diameter 302 is further secured onto the positioning instrument 200. The balloon 22, sleeve 12, and/or coil 312 can conform to positioning instruments 200 of different sizes and shapes. As shown in FIG. 21C, a twist lock mechanism 315 that can be used to assist in twisting the coil 312 for expansion and/or loading onto a positioning instrument 200. In some aspects, the twist lock mechanism 315 can be used to secure the balloon 22 and/or coil 312 to the positioning instrument 200.

FIGS. 22A-1 through 22B schematically illustrate a balloon 22 and braid 314 that can be used in conjunction with the dilator device 10. FIGS. 22A-1 and 22A-1-A illustrate a balloon 22 in an un-dilated configuration. The inner diameter 302 of the balloon 22 is coupled to a braid 314. The braid 314 is a cylindrical structure with walls made of woven, also described as braided, material. In some aspects, the walls of the braid 314 can be described as a mesh. The braid 314 can be made of a variety of materials, which can include polymers and metals. In some aspects, the walls of the braid 314 are embedded in the inner diameter 302 of the balloon 22. In some aspects, the walls of the braid 314 are coupled to a sleeve 12 which is in turn coupled to the inner diameter 302 of the balloon or is the inner diameter 302 of the balloon 22. The inner diameter 302 and braid 314 can surround a hollow interior 14. The balloon 22 can circumferentially surround a sleeve 12, the braid 314, and/or the hollow interior 14. The braid 314 can be loaded onto the positioning instrument 200 of FIG. 22A-2, as shown in FIG. 22B. The braid 314 can apply a compressive force on the positioning instrument 200 such that the braid 314 and the balloon 22 are fixedly coupled to the positioning instrument. Loading the braid 314 onto the positioning instrument 200 can cause the braid 314 and the balloon 22 to move with the positioning instrument 200. In some aspects, the diameter of the braid 314 can be expanded radially outward by longitudinally compressing the braid 314 such that the braid 314 can be loaded onto the positioning instrument 200. In some aspects, releasing the braid 314 from longitudinal compression can decrease the diameter of the braid 314 such that the braid 314 is loaded onto and around the positioning instrument 200, as illustrated in FIG. 22B. The balloon 22 can be dilated, expanding the outer diameter 304 and, in some aspects, extending or deflecting the inner diameter 302 inward such that the inner diameter 302 is further secured onto and/or against the positioning instrument 200. The balloon 22, sleeve 12, and/or braid 314 can conform to positioning instruments 200 of different sizes and shapes.

Other mechanisms can be used to fixedly couple a balloon 22 and/or sleeve 12 to a positioning instrument. For example, a spline employing memory material, a nitinol mechanism, a vacuum, and/or other mechanisms can be used. In some aspects, the balloons disclosed herein can be dilated with fluid, memory spline, and/or memory foam.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Any methods disclosed herein need not be performed in the order recited. The methods disclosed herein include certain actions taken by a practitioner; however, they can also include any third-party instruction of those actions, either expressly or by implication. For example, actions such as "controlling a motor speed" include "instructing controlling of a motor speed."

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Since many modifications, variations, and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A device for balloon dilation comprising:
an elongate sleeve comprising a hollow interior extending along a length thereof and a distal portion;
an access opening disposed on a proximal portion of the elongate sleeve in communicating relation with the hollow interior, wherein the access opening is dimensioned to removably receive a positioning instrument therein, and wherein the elongate sleeve is configured to conform the received positioning instrument;
a balloon circumferentially disposed about the distal portion of the elongate sleeve;
a dilation conduit extending proximally from the elongate sleeve and fluidly connecting the balloon to a fluid input;
a cylindrical braid coupled to the elongate sleeve, and wherein the braid is configured to fixedly couple the elongate sleeve and the balloon to the positioning instrument; and
wherein releasing the braid from a longitudinal compression, when positioned around the positioning instrument, is configured to cause a diameter of the braid to decrease in size such that the braid and elongate sleeve are loaded onto the positioning instrument.

2. The device of claim 1,
wherein the distal portion of the elongate sleeve comprises a resilient deformable material,
wherein upon dilation, an outer diameter of the balloon expands radially outwardly and an inner diameter of the balloon inwardly deflects into the hollow interior.

3. The device of claim 2, wherein the hollow interior comprises a substantially circular cross-section having a diameter, and the inner diameter is configured to inwardly to deflect such that the diameter of the hollow interior is reduced by at least 10%.

4. The device of claim 1, further comprising a tip forming a distal end of the elongate sleeve, the tip comprising:
an outer surface shaped to facilitate advancement of the elongate sleeve within a lumen of a human body;
an inner surface forming a distal end of the hollow interior; and
a distal access opening positioned in the tip and in communicating relation with the hollow interior.

5. The device of claim 4, wherein the inner surface of the tip comprises a conical taper narrowing to the distal access opening.

6. The device of claim 1, wherein an inward deflection of an inner diameter of the balloon is configured to fixedly couple at least one of the balloon and the elongate sleeve to the positioning instrument.

7. The device of claim 1, comprising an inner balloon disposed within the hollow interior of the elongate sleeve, and wherein an inner diameter of the inner balloon is configured to receive the positioning instrument.

8. The device of claim 7, wherein the inner balloon is positioned concentrically with the balloon.

9. The device of claim 7, wherein the inner diameter of the inner balloon, upon dilation, deflects radially inward such that the inner diameter is configured to fixedly couple the inner balloon to the positioning instrument.

10. The device of claim 1, wherein the elongate sleeve is made of an elastic material that is configured to fixedly couple the elongate sleeve and the balloon to the positioning instrument upon loading the elongate sleeve onto the positioning instrument.

11. The device of claim 10, wherein the elongate sleeve applies a radially inward compressive force to the positioning instrument upon loading thereon.

12. The device of claim 1, comprising a plurality of rings that are coupled to the elongate sleeve, wherein the plurality of rings are configured to fixedly couple the elongate sleeve and the balloon to the positioning instrument.

13. The device of claim 1, comprising a coil coupled to the elongate sleeve, and wherein the coil is configured to fixedly couple the elongate sleeve and the balloon to the positioning instrument.

14. A device for balloon dilation comprising:
a balloon comprising an inner diameter and an outer diameter, wherein the inner diameter defines a hollow interior that is configured to receive a positioning instrument, and wherein the balloon is configured to conform to a shape of the positioning instrument;
a cylindrical braid coupled to the balloon; and
a conduit fluidically coupling the balloon to a fluid input;
wherein the balloon is configured to dilate; and
wherein the braid and the inner diameter are configured to fixedly couple the balloon to the positioning instrument when the positioning instrument is positioned within the hollow interior; and
wherein releasing the braid from a longitudinal compression, when positioned around the positioning instrument, is configured to cause a diameter of the braid to decrease in size such that the braid and elongate sleeve are loaded onto the positioning instrument.

15. The device of claim 14, comprising a plurality of rings that are coupled to the balloon, wherein the plurality of rings are configured to fixedly couple the balloon to the positioning instrument.

16. The device of claim 14, comprising a coil coupled to the balloon, and wherein the coil is configured to fixedly couple the balloon to the positioning instrument.

17. A device for balloon dilation comprising:
a balloon comprising an inner diameter and an outer diameter, wherein the inner diameter defines a hollow interior that is configured to receive a positioning instrument, and wherein the balloon is configured to conform to a shape of the positioning instrument;
a coil coupled to the balloon, and wherein the coil is configured to fixedly couple the balloon to the positioning instrument; and
a conduit fluidically coupling the balloon to a fluid input;
wherein the balloon is configured to dilate;
wherein the coil is expanded to receive the positioning instrument by twisting the coil; and
wherein releasing the coil from the expanded configuration, when positioned around the positioning instrument, is configured to cause a diameter of the coil to decrease in size such that the coil and the balloon are loaded onto the positioning instrument.

* * * * *